(12) United States Patent
Inoue et al.

(10) Patent No.: US 11,836,194 B2
(45) Date of Patent: Dec. 5, 2023

(54) MOBILE INFORMATION DEVICE, IMAGE PICKUP DEVICE, AND INFORMATION ACQUISITION SYSTEM

(71) Applicant: NIKON CORPORATION, Tokyo (JP)

(72) Inventors: Hideya Inoue, Yokohama (JP); Toru Iwaoka, Yotsukaido (JP); Michiko Noborisaka, Yokohama (JP); Masayuki Hatori, Soka (JP); Tomohide Hamada, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 272 days.

(21) Appl. No.: 16/554,725

(22) Filed: Aug. 29, 2019

(65) Prior Publication Data

US 2020/0012692 A1 Jan. 9, 2020

Related U.S. Application Data

(62) Division of application No. 12/706,142, filed on Feb. 16, 2010, now Pat. No. 10,430,471.
(Continued)

(30) Foreign Application Priority Data

Feb. 20, 2009 (JP) ................................. 2009-038303

(51) Int. Cl.
*G06F 16/951* (2019.01)
*G06F 16/9535* (2019.01)
(Continued)

(52) U.S. Cl.
CPC ....... *G06F 16/951* (2019.01); *G01C 21/3423* (2013.01); *G01C 21/3602* (2013.01);
(Continued)

(58) Field of Classification Search
CPC ............... G06F 16/951; G06F 16/9535; G06F 16/9537; G06F 16/10; G06F 16/93;
(Continued)

(56) References Cited

U.S. PATENT DOCUMENTS

| 6,185,591 B1 | 2/2001 | Baker et al. |
| 6,282,362 B1 | 8/2001 | Murphy et al. |

(Continued)

FOREIGN PATENT DOCUMENTS

| CN | 1581153 A | 2/2005 |
| CN | 1896684 A | 1/2007 |

(Continued)

OTHER PUBLICATIONS

Dec. 15, 2020 Office Action issued in European Patent Application No. 10 743 556.2.
(Continued)

*Primary Examiner* — Cam Y T Truong
(74) *Attorney, Agent, or Firm* — Oliff PLC

(57) ABSTRACT

An information acquisition system includes: a mobile terminal; and an information search system. The information search system searches for information on a route based on route information input from the mobile terminal and transmits a search result to the mobile terminal, and the mobile terminal includes a navigation unit that navigates the route from a departure point to a destination. The information search system includes: a database in which information on the route is stored in correspondence with the route information; and an information search server that searches for the information on the route from the database based on the route information and acquires reservation information for transportation on the route based on the information on the route from a reservation system of the transportation, and the information search server transmits the reservation informa-
(Continued)

tion to the mobile terminal together with the information on the route.

10 Claims, 18 Drawing Sheets

Related U.S. Application Data

(60) Provisional application No. 61/202,668, filed on Mar. 25, 2009.

(51) Int. Cl.
  *G06F 16/9537* (2019.01)
  *G06F 16/93* (2019.01)
  *G01C 21/36* (2006.01)
  *G06Q 10/02* (2012.01)
  *G06Q 30/02* (2023.01)
  *G08G 1/005* (2006.01)
  *G08G 1/0968* (2006.01)
  *G08G 1/127* (2006.01)
  *G01C 21/34* (2006.01)
  *G06F 16/10* (2019.01)

(52) U.S. Cl.
  CPC ..... *G01C 21/3679* (2013.01); *G06F 16/9535* (2019.01); *G06F 16/9537* (2019.01); *G06Q 10/02* (2013.01); *G06Q 30/02* (2013.01); *G08G 1/005* (2013.01); *G08G 1/096811* (2013.01); *G08G 1/096838* (2013.01); *G08G 1/096883* (2013.01); *G08G 1/096894* (2013.01); *G08G 1/127* (2013.01); *G06F 16/10* (2019.01); *G06F 16/93* (2019.01)

(58) Field of Classification Search
  CPC ............. G06F 16/248; G06F 16/24578; G01C 21/3423; G01C 21/3602; G01C 21/3679; G01C 21/3484; G01C 21/3623; G06Q 10/02; G06Q 30/02; G06Q 50/01; G08G 1/005; G08G 1/096811; G08G 1/096838; G08G 1/096883; G08G 1/096894; G08G 1/127
  See application file for complete search history.

(56) References Cited

U.S. PATENT DOCUMENTS

| | | | |
|---|---|---|---|
| 6,741,929 B1 | 5/2004 | Oh et al. | |
| 6,819,356 B1 | 11/2004 | Yumoto | |
| 7,016,899 B1 | 3/2006 | Stern et al. | |
| 7,114,179 B1 | 9/2006 | Ritter et al. | |
| 7,304,754 B1* | 12/2007 | Nakamura | G11B 27/105 358/1.9 |
| 7,477,295 B2 | 1/2009 | Tanaka | |
| 7,761,229 B2 | 7/2010 | Onishi et al. | |
| 7,823,193 B2 | 10/2010 | Ritter et al. | |
| 7,912,459 B2 | 3/2011 | Endo et al. | |
| 8,036,386 B2 | 10/2011 | Katayama | |
| 8,191,787 B2 | 6/2012 | Kuchen et al. | |
| 8,423,735 B2 | 4/2013 | Akirav et al. | |
| 2002/0033940 A1* | 3/2002 | Hedges | G01C 15/002 356/141.4 |
| 2002/0045988 A1 | 4/2002 | Yokota | |
| 2002/0072938 A1 | 6/2002 | Black et al. | |
| 2003/0135539 A1 | 7/2003 | Kondo et al. | |
| 2003/0193390 A1 | 10/2003 | Muramatsu | |
| 2004/0145660 A1* | 7/2004 | Kusaka | H04N 5/23206 386/E5.072 |
| 2004/0189813 A1 | 9/2004 | Tanaka | |
| 2004/0202132 A1 | 10/2004 | Heinonen et al. | |
| 2005/0001024 A1 | 1/2005 | Kusaka et al. | |
| 2005/0033508 A1 | 2/2005 | Sakakibara et al. | |
| 2005/0046706 A1 | 3/2005 | Sesek et al. | |
| 2005/0049975 A1 | 3/2005 | Katayama | |
| 2005/0125683 A1 | 6/2005 | Matsuyama et al. | |
| 2006/0002607 A1* | 1/2006 | Boncyk | G06F 16/5866 382/165 |
| 2006/0190309 A1 | 8/2006 | Ewart et al. | |
| 2006/0193623 A1 | 8/2006 | Funakura | |
| 2006/0199612 A1* | 9/2006 | Beyer | H04M 1/72466 455/556.2 |
| 2006/0230415 A1 | 10/2006 | Roeding | |
| 2006/0250507 A1 | 11/2006 | Miyajima et al. | |
| 2006/0277078 A1 | 12/2006 | Ohmori et al. | |
| 2007/0010924 A1 | 1/2007 | Otani et al. | |
| 2007/0036469 A1 | 2/2007 | Kim et al. | |
| 2007/0066358 A1* | 3/2007 | Silverbrook | G06Q 30/02 455/557 |
| 2007/0073719 A1 | 3/2007 | Ramer et al. | |
| 2007/0143155 A1* | 6/2007 | Whitsett | G06Q 10/047 705/5 |
| 2007/0155411 A1 | 7/2007 | Morrison | |
| 2007/0162942 A1 | 7/2007 | Hamynen et al. | |
| 2007/0206001 A1* | 9/2007 | McKay | G09F 27/00 348/E7.087 |
| 2007/0281689 A1 | 12/2007 | Altman et al. | |
| 2008/0132251 A1 | 6/2008 | Altman et al. | |
| 2008/0142581 A1 | 6/2008 | Roebke et al. | |
| 2008/0147730 A1 | 6/2008 | Lee et al. | |
| 2008/0268876 A1 | 10/2008 | Gelfand et al. | |
| 2009/0043626 A1* | 2/2009 | Choi | G06Q 30/0259 |
| 2009/0096875 A1 | 4/2009 | Yoshimaru et al. | |
| 2009/0175599 A1* | 7/2009 | Grim, III | G11B 27/034 386/200 |
| 2009/0198661 A1 | 8/2009 | Miyajima et al. | |
| 2009/0234564 A1 | 9/2009 | Onishi et al. | |
| 2010/0030612 A1* | 2/2010 | Kim | G06Q 10/1093 701/410 |
| 2010/0036689 A1 | 2/2010 | Halavais et al. | |
| 2010/0175001 A1 | 7/2010 | Lazarus et al. | |

FOREIGN PATENT DOCUMENTS

| | | | |
|---|---|---|---|
| CN | 101076816 A | 11/2007 | |
| DE | 102007029685 A1 | 1/2009 | |
| DE | 102007029685 A1 * | 1/2009 | ............. G01C 21/04 |
| EP | 1 162 435 A2 | 12/2001 | |
| EP | 1 679 673 A1 | 7/2006 | |
| EP | 1 703 426 A1 | 9/2006 | |
| EP | 1734341 A1 | 12/2006 | |
| EP | 1760430 A2 | 3/2007 | |
| EP | 1 830 313 A1 | 9/2007 | |
| EP | 1 903 310 A2 | 3/2008 | |
| EP | 1 939 684 A1 | 7/2008 | |
| GB | 2412520 A | 9/2005 | |
| JP | 10-091634 A | 4/1998 | |
| JP | H11-066355 A | 3/1999 | |
| JP | 2001-043291 A | 2/2001 | |
| JP | 2001-216309 A | 8/2001 | |
| JP | 2002-022476 A | 1/2002 | |
| JP | 2002-94870 A | 3/2002 | |
| JP | 2002-114149 A | 4/2002 | |
| JP | 2002-175315 A | 6/2002 | |
| JP | 2002-175354 A | 6/2002 | |
| JP | 2002-357436 A | 12/2002 | |
| JP | 2003-077015 A | 3/2003 | |
| JP | 2003-132068 A | 5/2003 | |
| JP | 2003-174578 A | 6/2003 | |
| JP | 2003-302240 A | 10/2003 | |
| JP | 2004-15187 A | 1/2004 | |
| JP | 2004-206482 A | 7/2004 | |
| JP | 2004-334517 A | 11/2004 | |
| JP | 2004-341960 A | 12/2004 | |
| JP | 2005-025116 A | 1/2005 | |
| JP | 2005-027216 A | 1/2005 | |
| JP | 2005-135241 A | 5/2005 | |
| JP | 2005-265551 A | 9/2005 | |
| JP | 2006-3963 A | 1/2006 | |
| JP | 2006-171959 A | 6/2006 | |

(56) References Cited

FOREIGN PATENT DOCUMENTS

| | | | |
|---|---|---|---|
| JP | 2006-194665 A | 7/2006 |
| JP | 2006-235979 A | 9/2006 |
| JP | 2006-254294 A | 9/2006 |
| JP | 2006-260338 A | 9/2006 |
| JP | 2006-352561 A | 12/2006 |
| JP | 2007-17803 A | 1/2007 |
| JP | 2008-77311 A | 4/2008 |
| JP | 2008-111693 A | 5/2008 |
| JP | 2008-210364 A | 9/2008 |
| JP | 2008-234084 A | 10/2008 |
| JP | 2008-234378 A | 10/2008 |
| JP | 2008-244660 A | 10/2008 |
| JP | 2008-250474 A | 10/2008 |
| JP | 2009-17540 A | 1/2009 |
| JP | 2009-60339 A | 3/2009 |
| TW | 200519789 A | 6/2005 |
| TW | 201024674 A | 7/2010 |
| WO | 2005/088255 A1 | 9/2005 |
| WO | 2009/011018 A1 | 1/2009 |

OTHER PUBLICATIONS

Apr. 28, 2020 Office Action issued in European Patent Application No. 10 743 556.2.
May 29, 2015 Decision of Reexamination issued in Chinese Application No. 201080009386.2.
Jul. 14, 2015 Office Action issued in Taiwanese Application No. 099104262.
Nov. 26, 2015 Office Action issued in Chinese Patent Application No. 201080009386.2.
May 3, 2016 Office Action issued in Chinese Patent Application No. 201310522786.9.
Jun. 7, 2016 Office Action issued in Japanese Patent Application No. 2011-500510.
Jul. 12, 2016 Office Action issued in Japanese Patent Application No. 2015-101417.
Jul. 4, 2016 Office Action issued in European Patent Application No. 10743556.2.
Aug. 22, 2016 Office Action issued in Taiwanese Patent Application No. 104139623.
Jan. 10, 2017 Office Action issued in Japanese Patent Application No. 2015-101417.
Nov. 30, 2016 Office Action issued in Chinese Patent Application No. 201310522786.9.
May 29, 2017 Office Action issued in European Patent Application No. 10743556.2.
May 5, 2017 Office Action issued in Chinese Patent Application No. 201310522786.9.
Nov. 14, 2017 Office Action issued in Taiwanese Patent Application No. 106104997.
Apr. 4, 2018 Office Action issued in Chinese Patent Application No. 201310522786.9.
Apr. 3, 2018 Office Action issued in Chinese Patent Application No. 201510583926.2.
May 8, 2018 Office Action issued in Japanese Patent Application No. 2017-077110.
Sep. 25, 2018 Office Action issued in Chinese Patent Application No. 201610105203.6.
Jan. 8, 2019 Office Action issued in Japanese Patent Application No. 2017-077110.
Mar. 22, 2019 Office Action issued in Chinese Patent Application No. 2015-10583926.2.
Nov. 25, 2014 Office Action issued in Japanese Patent Application No. 2011-500510.
Aug. 20, 2014 Office Action issued in Taiwanese Application No. 099104262.
Jun. 2, 2014 Search Report issued in European Patent Application No. 10743556.2.
Mar. 13, 2014 Office Action issued in Chinese Patent Application No. 201080009386.2.
Apr. 1, 2014 Office Action issued in Japanese Patent Application No. 2011-500510.
Aug. 1, 2013 Office Action issued in Chinese Patent Application No. 201080009386.2.
Dec. 5, 2012 Office Action issued in Chinese Patent Application No. 201080009386.2.
Takebe, Kenichi, Nikkei Communications, Nov. 2008, vol. 521, Nikkei Business Publications, Inc., pp. 46-51.
Hashimoto, Akimasa et al., "Outdoor Annotation System by Sensor Fusion," IEICE Technical Report, Sep. 2006, vol. 106, No. 234, pp. 97-102.
International Search Report and Written Opinion for International Application No. PCT/JP2009/064330, dated Oct. 23, 2009.
International Search Report and Written Opinion for International Application No. PCT/JP2010/000990, dated Mar. 23, 2010.
Oct. 24, 2012 Office Action issued in U.S. Appl. No. 12/706,142.
Jul. 10, 2013 Office Action issued in U.S. Appl. No. 12/706,142.
Jan. 9, 2014 Office Action issued in U.S. Appl. No. 12/706,142.
May 28, 2015 Office Action issued in U.S. Appl. No. 12/706,142.
Dec. 2, 2015 Office Action issued in U.S. Appl. No. 12/706,142.
Aug. 25, 2016 Office Action issued in U.S. Appl. No. 12/706,142.
Mar. 10, 2017 Office Action issued in U.S. Appl. No. 12/706,142.
Sep. 21, 2017 Office Action issued in U.S. Appl. No. 12/706,142.
Apr. 4, 2018 Office Action issued in U.S. Appl. No. 12/706,142.
Oct. 5, 2018 Office Action issued in U.S. Appl. No. 12/706,142.
Oct. 2, 2014 Notice of Allowance issued in U.S. Appl. No. 12/706,142.
May 22, 2019 Notice of Allowance issued in U.S. Appl. No. 12/706,142.
Aug. 11, 2020 Office Action issued in Japanese Patent Application No. 2019-072608.
Jun. 1, 2021 Office Action issued in Japanese Patent Application No. 2019-072608.
Hiroshi Iwatani, TechCrunch50, Activity of Japanese Group (2) Tonchidot, TechCrunch Japan, Sep. 10, 2008, [Retrieval date: May 20, 2021], Internet <URL: https://jp.techcrunch.com/2008/09/10/20080909techcrunch50-tonchidot/.
Kenichi Takabe, Deep Augmented Reality (AR), Fusion of "reality" and digital information, Bringing new services to mobile phones, Nikkei Communication, vol. 521, Japan, Nikkei Business Publications, Inc., Nov. 1, 2008, pp. 46-51.
Apr. 20, 2022 Extended European Search Report issued in European Patent Application No. 21205284.9.
Mar. 1, 2022 Office Action issued in Japanese Patent Application No. 2019-072608.
Mar. 17, 2023 Office Action issued in Chinese Patent Application No. 202010055507.2.
Jul. 5, 2023 Office Action issued in European Patent Application No. 21205284.9.
Jul. 1, 2023 Office Action issued in Chinese Patent Application No. 201910503122.5.
Aug. 25, 2023 Office Action issued in Chinese Patent Application No. 202010055507.2.
Sep. 28, 2023 Office Action issued in Chinese Patent Application No. 201910503122.5.

* cited by examiner

FIG. 2

| BUILDING IDENTIFICATION INFORMATION | NAME OF BUILDING | BUILDING INFORMATION | POSITION INFORMATION (LATITUDE AND LONGITUDE) | AZIMUTH INFORMATION | DESCRIPTION | POST INFORMATION |
|---|---|---|---|---|---|---|
| | | | | | | |
| | | | | | | |
| | | | | | | |

FIG. 12

| SCHEDULED ITEM | PLACE | START DATE AND TIME | ALARM TIME 1 | SCHEDULED END DATE AND TIME | ALARM TIME 2 |
|---|---|---|---|---|---|
| CONFERENCE | AA COMPANY | 10:30 19YY/MM/DD | XX | 11:30 19YY/MM/DD | XX |
| DINING | BB HOTEL | 12:00 19YY/MM/DD | X1 | 13:40 19YY/MM/DD | X1 |
| MEETING | CC COMPANY | 14:00 19YY/MM/DD | YX | 18:30 19YY/MM/DD | YX |
| DINNER | DD RESTAURANT | 19:00 19YY/MM/DD | YY | 19:00 19YY/MM/DD | YY |

FIG. 13

| TYPE | INTERVAL | DEPARTURE TIME | ALARM TIME 3 | ARRIVAL TIME | ALARM TIME 4 |
|---|---|---|---|---|---|
| TRAIN | TOKYO TO KYOTO | 08:00 19YY/MM/DD | X2 | 10:00 19YY/MM/DD | X1 |
| BUS | KYOTO TO ARASHIYAMA | 10:00 19YY/MM/DD | X3 | 10:20 19YY/MM/DD | X6 |
| BUS | ARASHIYAMA TO KYOTO | 18:00 19YY/MM/DD | Y4 | 18:30 19YY/MM/DD | Y5 |
| TRAIN | KYOTO TO TOKYO | 21:00 19YY/MM/DD | Y1 | 23:00 19YY/MM/DD | Y2 |

FIG. 14

| SEARCH ORDER | DATE | BUSINESS TRIP DESTINATION | IMAGE DATA A USED FOR SEARCH | IMAEG DATA B PICKED UP AT BUSINESS TRIP DESTINATION |
|---|---|---|---|---|
| 1 | 20XX/1/24 | SENDAI | | |
| 2 | 20XX/6/24 | NAGAOKA | | |
| 3 | 20XX/8/30 | YUFUIN | | |
| ⋮ | ⋮ | ⋮ | | |

FIG. 16

| KIND IDENTIFICATION INFORMATION | ITEM IDENTIFICATION INFORMATION | PRODUCT NAME | PRODUCT IDENTIFICATION INFORMATION | PRODUCT INFORMATION | STORE IDENTIFICATION INFORMATION | ADDRESS |
|---|---|---|---|---|---|---|
| | | | | | | |
| | | | | | | |
| | | | | | | |
| | | | | | | |
| | | | | | | |

MOBILE INFORMATION DEVICE, IMAGE PICKUP DEVICE, AND INFORMATION ACQUISITION SYSTEM

CROSS-REFERENCE TO RELATED APPLICATION

This is a divisional of U.S. Patent application Ser. No. 12/706,142, filed on Feb. 16, 2010 (now U.S. Pat. No. 10,430,471), which claims priority to and the benefit of U.S. provisional application No. 61/202,668, filed Mar. 25, 2009, and claims priority to Japanese Patent Application No. 2009-038303, filed Feb. 20, 2009. The entire contents of which are incorporated herein by reference.

BACKGROUND

Technical Field

The present invention relates to an information acquisition system that acquires information on a subject by using image data of the subject and an information acquisition system that acquires information on a route based on input route information.

Background Art

Conventionally, there are mobile information devices such as image pickup devices (for example, digital cameras), which have an image pickup function, each having a function for detecting position information on a position in which the mobile information device is located and processing picked up image data in correspondence with the detected position information (for example, see Japanese Patent Application Publication No. 2004-15187A).

SUMMARY

An object of embodiments of the present invention is to provide a mobile information device, an image pickup device, and an information acquisition system capable of completely implementing a user's activities.

Solution to Problem

According to an embodiment of the present invention, there is provided an information acquisition system including: a mobile terminal; and an information search system. The information search system searches for information on a route based on route information input from the mobile terminal and transmits a search result to the mobile terminal, and the mobile terminal includes a navigation unit that navigates the route from a departure point to a destination. The information search system includes: a database in which the information on the route is stored in correspondence with the route information; and an information search server that searches for the information on the route from the database based on the route information and acquires reservation information of transportation on the route based on the information on the route from a reservation system of the transportation, and the information search server transmits the reservation information to the mobile terminal together with the information on the route.

According to another embodiment of the present invention, there is provided an information acquisition system including: an image pickup device; and an information search system. The information search system searches for information on a subject based on the subject of which an image is picked up by the image pickup device and transmits a search result to the image pickup device. The image pickup device includes: an image pickup unit that picks up an image of the subject; a position information acquisition unit that acquires position information of an image pickup position; an angle information acquisition unit that acquires angle information that is information on an elevation angle for the subject from the image pickup position; and an azimuth information acquisition unit that acquires azimuth information representing an image pickup direction at the image pickup position. The information search system includes: a database in which the information on the subject is stored in correspondence with the position information and the azimuth information; and an information search server that searches for the information on the subject corresponding to the angle information, the position information, and the azimuth information, in which an image of the image data is picked up, from the database based on the angle information, the position information, and the azimuth information of the image data of the subject of which the image is picked up by the image pickup device.

According to another embodiment of the present invention, there is provided an information acquisition system including: an image pickup device; and an information search system. The information search system searches for information on a subject based on the subject of which an image is picked up by the image pickup device and transmits a search result to the image pickup device. The image pickup device includes: an image pickup unit that picks up the image of the subject; a position information acquisition unit that acquires position information of an image pickup position; a distance measuring unit that measures distance information between the subject and the image pickup position; and an azimuth information acquisition unit that acquires azimuth information representing an image pickup direction at the image pickup position. The information search system includes: a database in which the information on the subject is stored in correspondence with the position information and the azimuth information; and an information search server that searches for the information on the subject corresponding to the position information and the azimuth information in which image data is picked up from the database based on the distance information, the position information, and the azimuth information of the image data of the subject of which the image is picked up by the image pickup device.

According to another embodiment of the present invention, there is provided an information acquisition system including: an image pickup device; and an information search system. The information search system searches for information on a subject based on the subject of which an image is picked up by the image pickup device and transmits a search result to the image pickup device. The image pickup device includes: an image pickup unit that picks up an image of a subject; a position information acquisition unit that acquires position information of an image pickup position; and an azimuth information acquisition unit that acquires azimuth information representing an image pickup direction at the image pickup position. The information search system includes: a database in which the information on the subject and similar information similar to the information on the subject are stored in correspondence with the position information and the azimuth information; and an information search server that searches for the information on the subject corresponding to the position information and the azimuth information, in which the image data is picked up, and the similar information from the database based on the position information and the azimuth information of the image data picked up by the image pickup device.

According to another embodiment of the present invention, there is provided an image pickup device including: an image sensor; a position measuring device; an azimuth sensor; and an elevation angle sensor.

According to another embodiment of the present invention, there is provided a mobile information device including: an image sensor; a position measuring device; an azimuth sensor; an elevation angle sensor; and a display that displays an image of a target object through the image sensor and related information of the target object that is acquired based on measurement data of at least the position measuring device and the azimuth sensor.

According to another embodiment of the present invention, there is provided an information acquisition system including: a server; a database; and a mobile information device including an image sensor, a position measuring device, an azimuth sensor, an elevation angle sensor, a display, and a radio communication unit. The display displays an image of a target object via the image sensor and related information of the target object, and the related information of the target object that is acquired based on the measurement data of at least the position measuring device and the azimuth sensor is acquired from the database through the radio communication unit and the server.

According to some embodiments of the present invention, a mobile information device, an image pickup device, and an information acquisition system capable of completely implementing a user's activities are provided.

BRIEF DESCRIPTION OF THE DRAWINGS

FIG. 2 is a conceptual diagram representing a configuration example of a building structure table that is stored in a database represented in FIG. 1.

FIG. 12 is a conceptual diagram representing a configuration example of a schedule table of schedule management that is stored in a database according to this embodiment.

FIG. 13 is a conceptual diagram representing a configuration example of a reservation table of schedule management that is stored in a database according to this embodiment.

FIG. 14 is a conceptual diagram representing a configuration example of a history table that is stored in a database according to this embodiment.

FIG. 16 is a conceptual diagram representing the configuration of a side trip table that is stored in a database shown in FIG. 9.

DESCRIPTION OF EMBODIMENTS

First Embodiment

Figure 1:
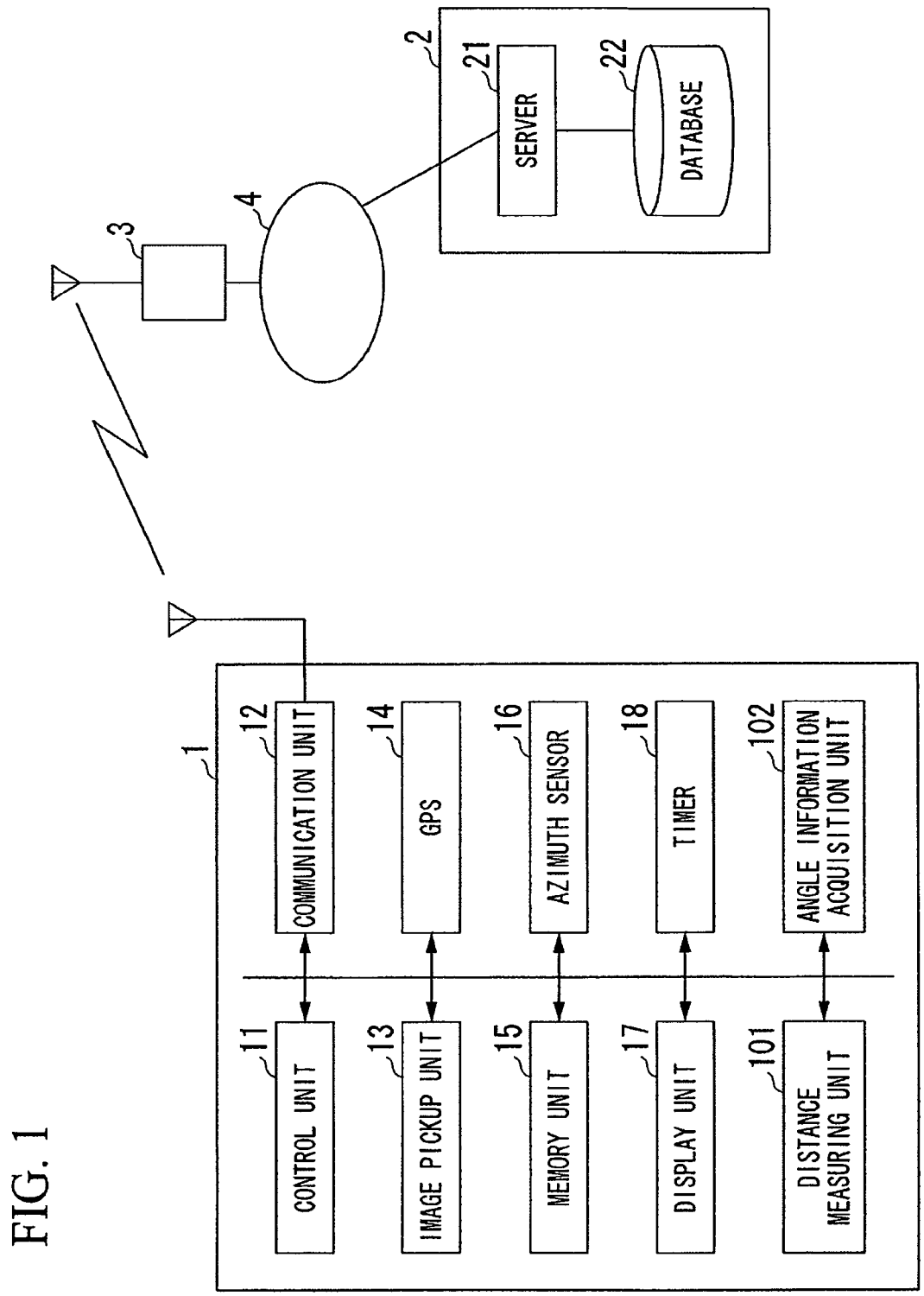
FIG. 1 is a block diagram representing a configuration example of an information acquisition system according to an embodiment of the present invention.

Hereinafter, an embodiment of the present invention will be described with reference to the drawings. FIG. 1 is a block diagram representing a configuration example of a mobile information device, an image pickup device, and an information acquisition system according to the embodiment.

In FIG. 1, the information acquisition system includes a digital camera 1 as an example of the image pickup device and an information search system 2. The digital camera 1 transmits or receives data to or from the information search system 2 (or an information search server 21 to be described later) through a wireless base station 3 and an information communication network 4 such as the Internet by performing data communication with the wireless base station 3 through radio communication. The image pickup device according to this embodiment is a mobile terminal having an image pickup function such as the above-described digital camera 1 or a camera-equipped cellular phone.

The digital camera 1 has a browsing function. The digital camera 1 includes a control unit 11, a communication unit 12, an image pickup unit 13, a GPS (Global Positioning System) (a position information acquisition unit, a position measuring device) 14, a memory unit 15, an azimuth sensor 16, a display unit 17, and a timer 18. Here, the radio communication according to this embodiment includes communication using electric waves, light, sound waves, or the like without using any wire as a transmission channel.

The image pickup unit 13 includes a CCD (charge coupled device) image sensor or a CMOS (complementary metal oxide semiconductor) image sensor, a lens, and the like. The image pickup device 13 picks up an image of a subject (a target object for imaging) and outputs image data to the control unit 11. In the description below, a subject according to this embodiment represents a building structure (a commercial building such as a store, a public building such as a school or a hospital, a factory, a house such as a mansion, an artificial construction such as a steel tower, a bridge, a dam, an amusement park, a bronze statue, or the like).

When receiving a control signal (for example, a control signal output by a peripheral circuit, not shown in the figure, that has detected the press of an image pickup button B1) from a user for directing to pickup an image or a control signal (for example, a control signal output by a peripheral circuit, not shown in the figure, that has detected the selection of an icon (a marker) by the user touching the icon that represents a search or the like) for directing an information search, the GPS 14 acquires information on the latitude and longitude of the digital camera 1 and outputs the information to the control unit 11.

The azimuth sensor 16 is configured by an electronic compass, an electromagnetic compass, a geomagnetic sensor, or the like. When receiving a control signal (for example, a control signal output by a peripheral circuit, not shown in the figure, that has detected pressing-down of an image pickup button B1) for directing to pick up an image or a control signal (for example, a control signal output by a peripheral circuit, not shown in the figure, that has detected the selection of an icon (indicator) by user's touching the icon that represents a search or the like with a finger, a touch pen, or the like) for directing to perform an information search, the azimuth sensor 16 detects the azimuth, for example, of a serial direction in which the CCD and the lens of the image pickup unit 13 are disposed and outputs the detected azimuth to the control unit 11 as the azimuth information. In addition, the azimuth sensor 16 may be configured to detect the azimuth of the direction of the subject (that is, an image pickup direction) viewed from the user and output the azimuth to the control unit 11 as azimuth information. Here, in a case where an azimuth angle is employed as the azimuth information, the azimuth angle is represented in units of degrees, minutes and seconds, for example, as the reference (0 degrees) for the north side and as the west side (90 degrees), the south side (180 degrees), and the east side (270) clockwise from the north with the latitude and longitude of the position information used as the center point.

When a control signal for directing to pick up an image is received from a peripheral circuit not shown in the figure by the user's pressing of the image pickup button B1 or the like, the control unit 11 assigns image identification information to the picked up image data and writes the pickup up image data, time data acquired from the timer 18, the position information, and the azimuth information to the memory unit 15 in association with each image identification information, in the order of imaging.

The display unit 17 displays the image data that is picked up by the image pickup unit 13 or the image data that is selected by the user as an image to be displayed and is read out from the memory unit 15 by the control unit 11.

In addition, the display unit 17, as described below, displays the image data received from the information search system 2, text data input by the user, or the like under the control of the control unit 11.

The communication unit 12 transmits or receives data such as image data, text data, a control signal, or the like to or from the information search system 2 through the information communication network 4 by transmitting or receiving data to or from the wireless base station 3 using wireless communication.

The information search system 2, as shown in FIG. 1, includes the information search server 21 and a database 22. The database 22 may be set up in a memory medium (for example, a memory, an HDD, or the like) inside the information search server 21, a memory medium that is externally attached, or a memory medium of another terminal.

In the database 22, as a building structure table represented in FIG. 2, building structure identification information (for example, information generated based on the latitude and the longitude of a building structure) used for identifying building structures, the names of the buildings, building information (information such as an address, a telephone number, a type, and information on peripheral image data of the building), the position information such as the latitude and the longitude of the building, descriptions of the buildings (information prepared by a store for a case where the building is a store), and posted information (comments such as review by a visiting user, image data posted by the user, or the like) are stored.

In addition, in the database 22, the map data, in which the registered building structures are disposed with the latitude and the longitude set as the coordinate axes in a two-dimensional plane, is stored. Here, in the map data, each building structure is represented in a position at the latitude and the longitude corresponding to the building identification information.

The information search server 21 searches for a building that is closest from the position at the latitude and the longitude represented by the position information in the direction represented by the azimuth information by using the position information and the azimuth information described above which have been input and acquires the building identification information of the found building structure.

In addition, the information search server 21 searches for a building corresponding to the building identification information of the found and acquired building from the building table and transmits the information of the found building (the building name, the building information, and the like) to the digital camera 1. Alternatively, the information search server 21 may be configured to selectively transmit the information of the building to be transmitted to the digital camera 1, for example, depending on the need for the capacity of the transmission data or the reception data or the like. In such a case, the information search server 21 may be configured to retransmit the remaining information out of the information of the building structure to the digital camera 1, for example, in accordance with a predetermined operation (for example, a request from the digital camera 1) or the like.

<Searching for Information on Image Picked Up by Digital Camera 1>

Figure 3:
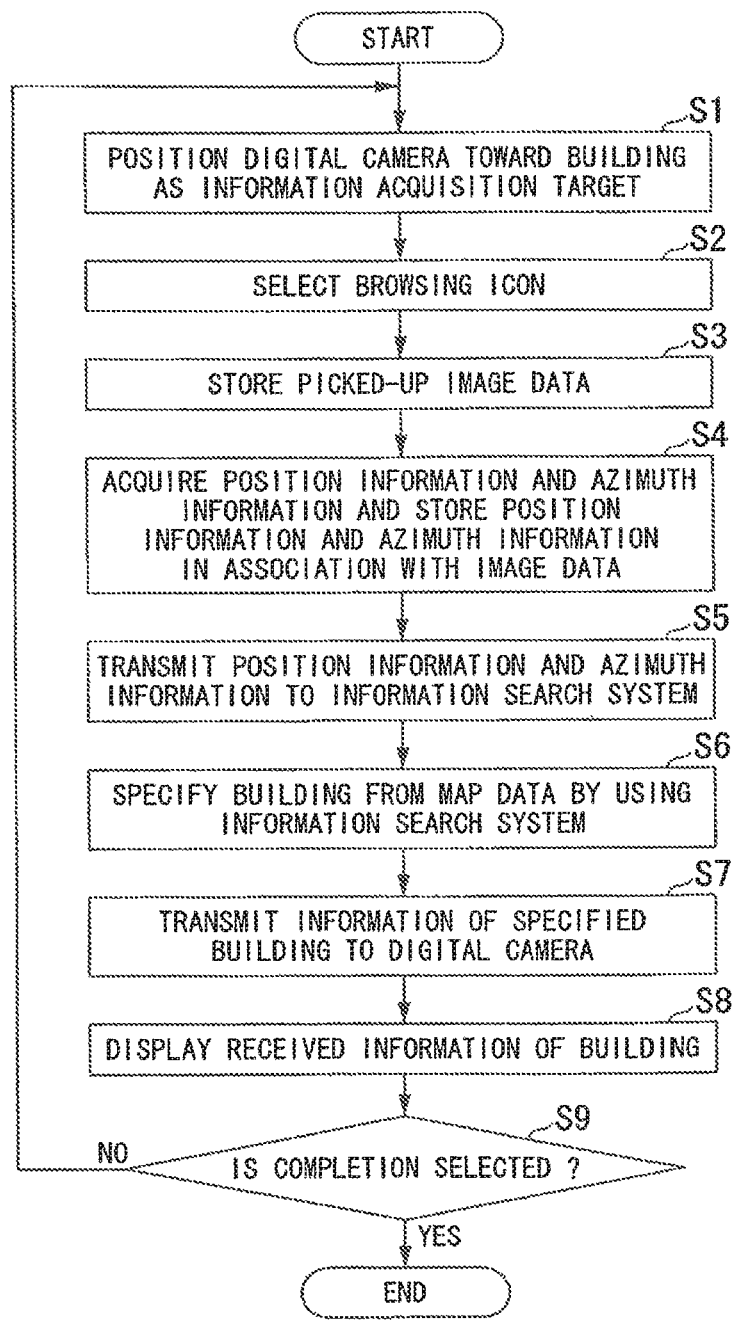
FIG. 3 is a flowchart representing the flow of an information searching process for an image of which the image is picked up by a digital camera according to this embodiment.
Figure 4:
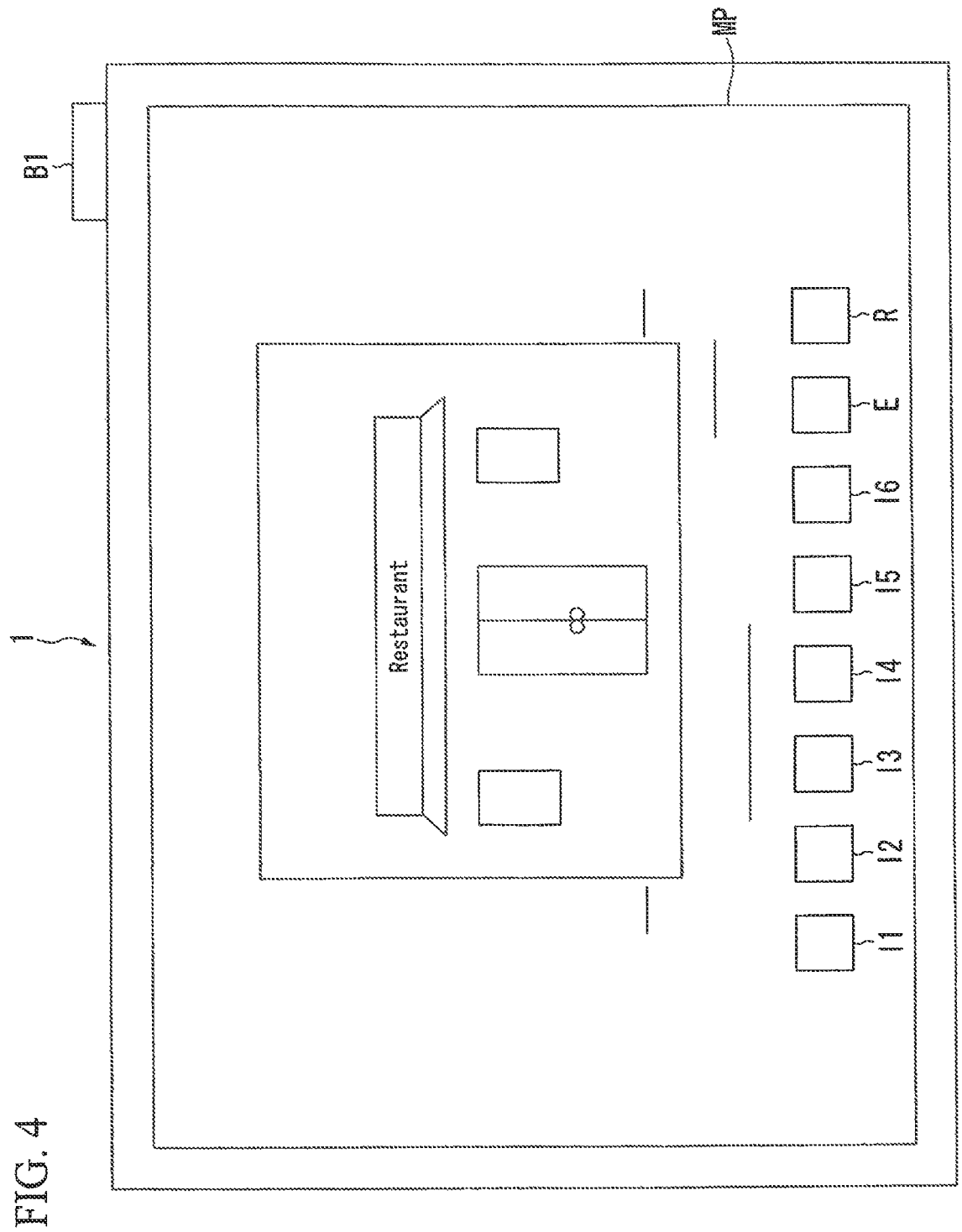
FIG. 4 is a conceptual diagram representing an example of a display image displayed in a digital camera according to this embodiment.
Figure 5:
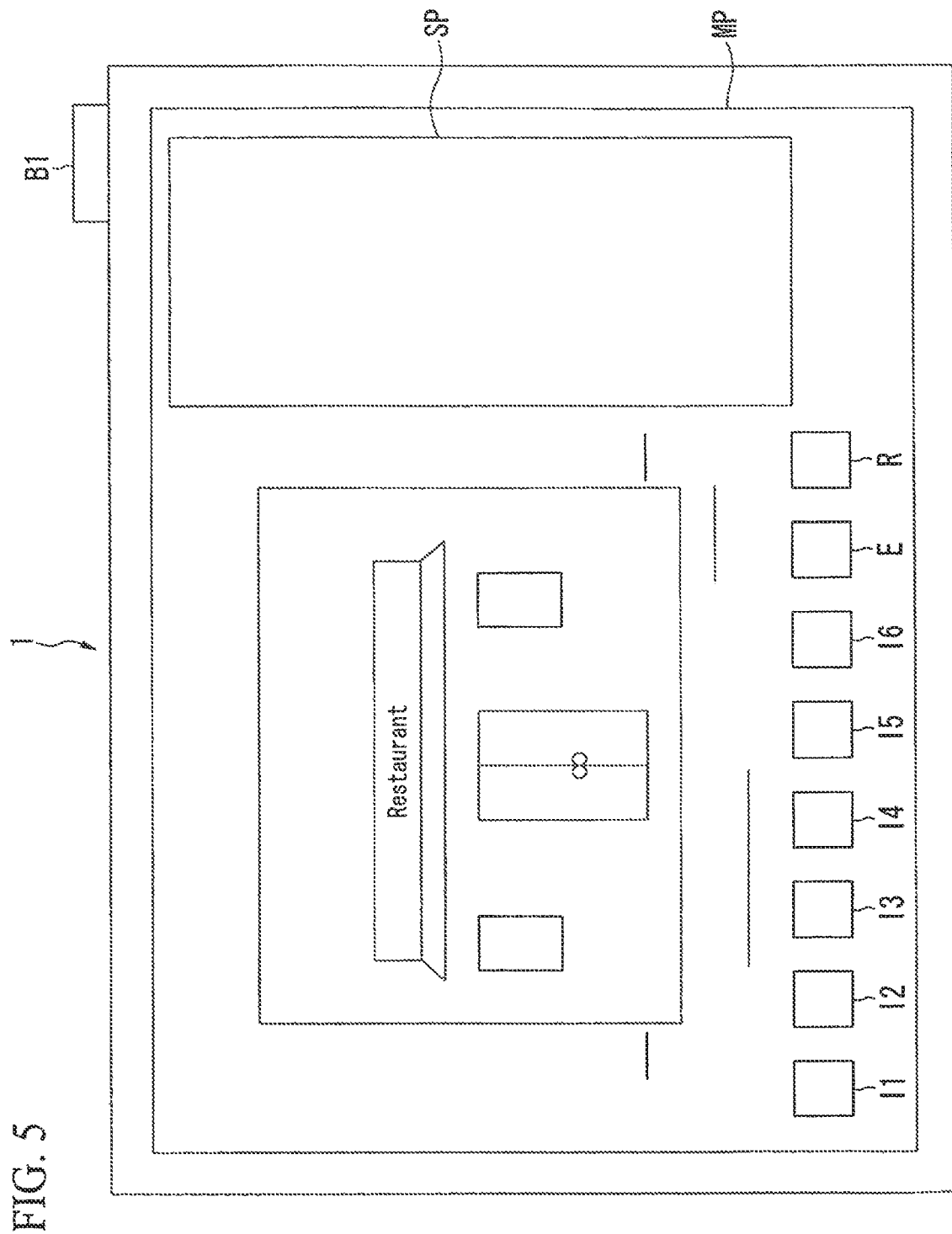
FIG. 5 is a conceptual diagram representing an example of a display image displayed in a digital camera according to this embodiment.
Figure 6:
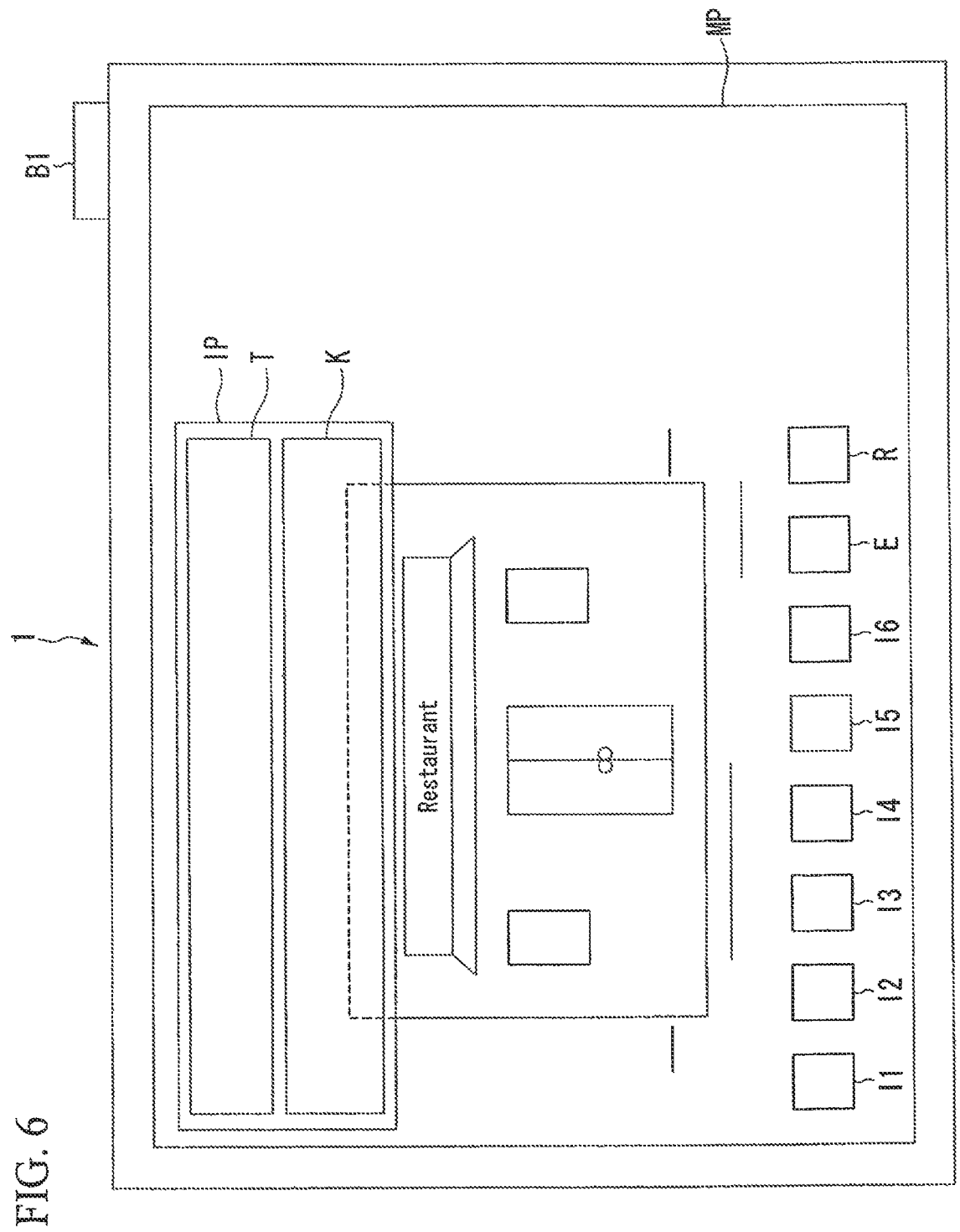
FIG. 6 is a conceptual diagram representing an example of a display image displayed in a digital camera according to this embodiment.

Next, the operation of this embodiment will be described with reference to FIGS. 1 and 3 together with FIGS. 4 to 6. FIG. 3 is a flowchart representing an example of an information searching process according to this embodiment for a case where an information search is desired to be performed in a state in which the digital camera 1 is in the process of picking up the image of a building structure. FIGS. 4 to 6 are diagrams representing the disposition of a screen displayed in the display unit 17 of the digital camera 1 and the image pickup button B1 of the digital camera.

In the description below, as an example, a case where a user searches for a restaurant while walking down a downtown street will be described.

When the user finds a restaurant having an exterior appearance of which information is desired to be acquired with the lens of the digital camera 1 positioned toward the restaurant having the favorable exterior view while strolling in the downtown street (Step S1), as shown in FIG. 4, the user touches (presses down) a browsing icon I1 that is set up in the image displaying field MP of the digital camera 1, thereby the browsing icon I1 is selected (Step S2).

At this moment, the control unit 11 displays image data, of which the image is picked up by the image pickup unit 13, that is input from the image pickup unit 13 in the image pickup state, that is, the image data of a restaurant of which the image is picked up, as shown in FIG. 4, in the image displaying field MP through the display unit 17. In addition, the image displaying field MP (image display unit) according to this embodiment is configured of a touch panel (for example, including a pressure-sensitive type, an electrostatic type, or a sound wave type).

In the above-described Step S2, the browsing icon I1 may be configured to be selected by being touched after the image pickup button B1 of the digital camera 1 is pressed down, while the image displaying field MP in which the image of the restaurant is displayed is viewed.

By touching the browsing icon I1, a signal indicating the selection of the browsing icon I1 is output from a peripheral circuit not shown in the figure to the control unit 11.

Then, the control unit 11 detects the selection of the browsing icon I1 in accordance with the input signal indicating the selection of the input browsing icon I1, assigns image identification information to the image data of the above-described restaurant, the image of which is picked up by the image pickup unit 13, and writes the image data and the image pickup time in the memory unit 15 in association with the image identification information for storing the image data (Step S3).

In addition, when the browsing icon I1 is touched, the control unit 11 writes the position information acquired by the GPS 14 and the azimuth information acquired by the azimuth sensor 16 in the memory unit 15 in association with the image identification information as related information (Step S4).

Then, after writing the image data and the related information in the memory unit 15, the control unit 11 transmits a search request signal that includes the camera identification information (user identification information assigned to a user or identification information assigned to a digital camera 1) for identifying the digital camera 1, the position information, and the azimuth information to the information search system 2 through the communication unit 12 (Step S5). Alternatively, the control unit 11 may be configured to transmit the search request signal to the information search system 2 through the communication unit 12 without writing the image data, the related information, and the like in the memory unit 15 in the above-described Steps S3 to S5.

Next, when the information search server 21 of the information search system 2 receives the above-described search request signal from the digital camera 1, the information search server 21 identifies a building of a search target from the map data of the database 22 based on the position information and the azimuth information that are included in the search request signal. Then, the information search server 21 transmits all information in the corresponding building table, which is included in the building table represented in FIG. 2, based on the building identification information of the identified building to the digital camera 1 as search result information including the building identification information (Step S7). As an example, at this moment, the information search server 21 reads out the address of the digital camera 1 on the network which is added for a case where the search request signal is transmitted from the digital camera 1 through the communication unit 12 and transmits the search result information to this address. Alternatively, in the above-described Step S7, the information search server 21 may be configured to identify the building of the search target based on the map data of the database 22 based on the position information and the azimuth information, which are included in the search request signal, only in a case where registration of the camera identification information included in the search request signal in the above-described user registration table that is stored in the database 22 is detected. In such a case, when the camera identification information included in the search request signal is detected not to be registered in the above-described user registration table, it is preferable that the information search server 21 transmits information indicating the need for user registration, for example, on the basis of the camera identification information to the digital camera 1.

Then, when the control unit 11 of the digital camera 1 receives the above-described search results information from the information search system 2 through the communication unit 12, as shown in FIG. 5, the control unit 11 displays the building information (related information) in the information displaying field SP through the display unit 17 (Step S8). For example, when the building is a restaurant, the information on the type of the restaurant (Chinese, Japanese, French, Italian, or the like) and a telephone number, an address, and the like of the restaurant are displayed. In addition, the information displaying field SP represented in FIG. 5 is an example according to this embodiment, and the information displaying field SP may be displayed such that a part thereof is overlapped with the image of the restaurant. In addition, the information displaying field SP is a part of the image displaying field MP. The information displaying field SP is displayed, for example, by touching the above-described browsing icon I1, a CM icon I2 to be described later, or the like for the selection.

In addition, when the user touches the CM icon I2, the above-described peripheral circuit outputs a signal indicating the selection of the CM icon I2 to the control unit 11.

Accordingly, the control unit 11 detects the selection of the CM icon I2 based on the input of the signal indicating the selection of the above-described CM icon I2 and displays commercial information (the menu, the number of seats, an image from inside the restaurant, the day's specials, or the like) of the restaurant that is included in the search results information in the information displaying field SP through the display unit 17. In addition, when the image data of the image inside the restaurant or the like is included in the commercial information (related information), the control unit 11 displays the image data in the information displaying field SP.

In addition, when the user touches a post browsing icon I3, the above-described peripheral circuit outputs a signal indicating the selection of the post browsing icon I3 to the control unit 11.

Accordingly, the control unit 11 detects the selection of the post browsing icon I3 based on the input of the signal indicating the selection of the above-described post browsing icon I3 and displays the posted information (comment) written by other users, which is included in the search results information, in the information displaying field SP through the display unit 17.

When there is a plurality of the above-described posted information (related information), the control unit 11 displays the plurality of posted information in the information displaying field SP, for example, in the order of the posted date.

The posted information may include image data. Thus, when the image data of each food item or the image data of the inside of the store that is picked up by other users is included in the posted information, the control unit 11 displays the image data in the information displaying field SP through the display unit 17.

Then, for example, when detecting a signal indicating touch to be slid from the left end of the information displaying field SP toward the right side in FIG. 5, the control unit 11 ends display in the information displaying field SP and displays the image of the above-described restaurant in the image displaying field MP as shown in FIG. 4 through the display unit 17. In addition, for example, when detecting a signal indicating the selection of the positing browsing icon I3 in the middle of display of the posted information in the information displaying field SP, the control unit 11 may be configured to end the display in the information displaying field SP or the display of the posted information.

In addition, for example, when displaying the commercial information (or the posted information) after displaying the building information in the information displaying field SP, the control unit 11 may be configured to display the commercial information together with the building information or to display the commercial information after removing the building information from the information displaying field SP.

In addition, when detecting a signal indicating touching of the image inside the store or the like that is displayed in the information displaying field SP, the control unit 11 displays an enlarged or reduced image of the image inside the store in the information displaying field SP (or the image displaying field MP).

In addition, when the user touches a mail icon I4, the above-described peripheral circuit outputs a signal indicating the selection of the mail icon I4 to the control unit 11.

Accordingly, the control unit 11 detects the selection of the mail icon I4 based on the input of the signal indicating the selection of the above-described mail icon I4 and displays an input field IP as shown in FIG. 6 in a part of the image displaying field MP through the display unit 17. Here, the input field IP is configured by a text field T to which the user inputs information or the like and a touch screen-type keyboard section K. This input field IP is used for the user to input positing information, the name of the store, or the year as described later.

The user inputs posted information such as the food they eat, the atmosphere inside the store, or the quality of service to the text field T of the input field IP by using the touch screen-type keyboard section K. Then, as the user touches the mail icon I4 again, the control unit 11 detects the selection of the mail icon I4, sets the text information written in the text field T and the image data displayed in the image displaying field P together with the camera identification information and the building structure identification information as the posted information, and transmits a search request signal including the posted information to the information search system 2 through the communication unit 12.

Then, when receiving the above-described search request signal from the digital camera 1, the information search server 21 writes new posted information that has been input to a post field of the building structure table of the database 22 in association with the building structure identification information. Alternatively, the information search server 21 may be configured to detect whether there is camera identification information, which is included in the search request signal, in the user registration table of the database 22 before writing the posted information, which is written in a post write field G3, in the post field of the building structure table of the database 22. In such a case, the above-described posted information may be configured to be written in the post field of the building structure table of the database 22 only in a case where registration of the camera identification information is detected.

Next, the control unit 11 detects whether a completion icon E is selected (Step S9). Here, when the user touches the completion icon E, the above-described peripheral circuit outputs a signal indicating the selection of the completion icon E to the control unit 11.

Then, when detecting the selection of the completion icon E based on the input of the signal indicating the selection of the completion icon E, the control unit 11 completes the information searching process.

On the other hand, when the signal indicating the selection of the completion icon E is not input, and the selection of the completion icon E is not detected, the control unit 11 returns the process to Step S1, and the image pickup process of the digital camera 1 and the information searching process are performed continuously.

When the browsing icon I1 is selected, the control unit 11 may allow the search request signal to be transmitted to the information search system 2 to include the picked up image data.

Then, the information search server 21 searches for peripheral image data of the building information from the building table by using the building structure identification information of the building structure that is extracted from the map data based on the position information and the azimuth information. The information search server 21 may be configured to determine the correspondence of the peripheral image data to the building of which the image is picked up by detecting whether the similarity is equal to or higher than a set value by comparing the peripheral image data of the building information found from the building table and the transmitted image data based on image recognition, and extracting the characteristic amount (data representing the color, the texture, the form, and the like as a multi-dimensional vector) from the image data, and comparing the extracted characteristic amount with the stored characteristic amount of the peripheral image data.

At this moment, in a case where the building relating to the peripheral image data and the building relating to the image data are determined not to be similar to each other as the result of comparison, the information search server 21 may be configured to identify a second closest building based on the position information and the azimuth information from the map data and compare the characteristic amounts again, and thereby the similarity between the peripheral image data of the newly identified building and the image data of which the image is picked up is evaluated.

In addition, the browsing icon I1 according to this embodiment, similarly to the above-described image pickup button B1, may be set up in the image pickup device 1 as a browsing button (not shown). In such a case, the function of the browsing button is the same as that of the above-described browsing icon I1. In addition, the image pickup button B1 according to this embodiment may be configured to serve as the browsing button by operating a switch unit not shown in the figure. In such a case, the browsing icon I1 or the browsing button is not needed.

As described above, when image processing for specifying a subject desired to be searched for is performed based on the image data, the position information, and the azimuth information, in a case where a plurality of subjects exists in the picked up image data, as examples of a method of determine which one of the plurality of subjects to a search target, the following two points are considered.

A subject that is positioned in a center portion (or an area occupying the center position) of an image is set to a search target with a high priority (the first in the order of being set to the search target).

In other words, when the image data is input from the digital camera 1 together with the position information and the azimuth information, the information search server 21 performs a process of extracting the contour of each subject from the image data. Then, the information search server 21 selects a subject of which the extracted contour coincides with or is similar to the center portion of the image data.

Then, the information search server 21 compares the image data of the selected subject and the peripheral image data based on the characteristic amounts of the images.

The subject to be searched for is selected by being touched in the image displaying field by the user.

In other words, when the image data is input from the digital camera 1 together with the position information and the azimuth information, the information search server 21 performs a contour extraction process of each subject of the image data, specifies each subject in the image data, and assigns subject identification information to each subject.

Then, the information search sever 21 transmits the image data of which the contour is extracted and data in which subject identification information is associated with each subject of the image data to the digital camera 1.

When the image data of which the contour is extracted is input, the control unit 11 displays the input image data in the image displaying field MP and displays text data urging a user to select a subject such as "Please select a subject" in the text field T.

When the user selects a subject by touching the subject in the image displaying field MP, the control unit 11 detects a subject located in a position corresponding to the touched position in the image displaying field MP and transmits the subject identification information of the subject to the information search server 21 through the communication unit 12.

When the subject identification information is input, the information search server 21 compares the image data of the subject corresponding to the input subject identification information with the peripheral image data based on the characteristic amounts of the images.

Next, the specifying of the subject, the image of which is picked up with arbitrary magnification by using zooming, will be described. In a case where a subject is specified in the image data picked up with zooming, the information search server 21 searches for the peripheral image data of the building structure information from the building structure table by using the building structure identification information of the building structure that is extracted from the map data based on the position information and the azimuth information that have been input. The information search server 21 compares the peripheral image data of the building structure information found in the building structure table with the transmitted image data based on image recognition. For example, the user takes an image by touching the zoom icon positioned in the image displaying field MP and touches the browsing icon I1. At this time, when transmitting the picked up image data to the information search server 21, the control unit 11 detects the user's touch on the zoom icon. Then, the control unit 11 adds zoom information, which indicates imaging process using zooming, to the picked up image data and transmits the picked up image data to the information search server 21 through the communication unit 12.

In a case where an image corresponding to the subject of the image data is not detected from the peripheral image data, when the zoom information of image pickup with zooming is added, the information search server 21 arranges a search range of a predetermined angle α that is respectively set on the positive side and the negative side in advance in correspondence with the multiplication of zooming (the multiplication of zooming-in and zooming-out) included in the zoom information for the azimuth angle included in the azimuth information set in advance and compares the peripheral image data corresponding to the building located within the search range with the image data based on image recognition.

In addition, as another method of specifying a subject in the case where the image of the subject is picked up with arbitrary multiplication by using zooming, an approximate position of a building in the map data may be specified by using distance information that indicates a distance between the digital camera 1 and the building to be searched, which is measured by a distance measuring device 101 (distance measuring unit) such as a range finder that is disposed in the digital camera 1 and measures the distance between the image pickup device 1 and the subject, in addition to the position information and the azimuth information, and a search may be performed within the search range.

In such a case, when transmitting the picked up image data to the information search server 21, the control unit 11 adds the zoom information indicating that the image of the subject is picked up by zooming and the above-described distance information to the picked up image data and transmits the picked up image data to the information search server 21 through the communication unit 12.

Then, the information search server 21 may compare the peripheral image data of the found building with the image data input from the digital camera 1 by specifying the position of the building in the map data based on the position information, the azimuth information and the distance information, which are input, and the above-described distance information and searching for the building within a search range set as a predetermined range from the above-described position as its center.

In addition, in a case where the above-described extracted building structure is a multi-story building and a plurality of stores is housed in the building, the information search server 21 transmits store names of all the stores housed in the building and store identification information corresponding to each store with being associated with each other to the digital camera 1 as a list data.

When the above-described list data is input, the control unit 11 displays a list of store names included in the list data in the image displaying field MP and displays text data such as "Please select the name of a store you are interested in!" urging the user to select a store name in the text field T.

Then, the control unit 11 detects the store name selected by the user based on the position touched on the image displaying field MP by the user and transmits the store identification information of the detected store name to the information search server 21 through the communication unit 12.

The information search server 21 reads out the store information corresponding to the store identification information, which is input from the digital camera 1, from the building table and transmits the read-out search results information to the digital camera 1.

When the search results information is input from the information search server 21, the control unit 11, as in Step S8 described above, displays the search results information in the information displaying field SP.

In such a case, in the building table of the database 22, the store identification information used for identifying a store is disposed as subordinate information of the building identification information, and a store name, store information (address, telephone number, business classification, and information such as image data of the entrance or the inside of the store), the position information based on the latitude and the longitude of the building structure or the like, a description of the store (information written by the store), and the posted information (comments such as valuations by visiting users, image data posted by the user, and the like) are stored in accordance with the store identification information used for identifying the store. In addition, the data described with reference to FIG. 2 is stored in the building structure table with being associated with the building structure identification information.

In addition, another method of selecting a store for the case where the building, which is set as a search target so as to be extracted as described above, is a multi-story commercial building will be described as below. As the selection method, in this embodiment, an angle information acquisition unit 102 (for example, an elevation angle sensor) is disposed in the digital camera 1, and elevation angle information (angle information) representing an elevation angle with the position information and the azimuth information may be configured to be transmitted to the information search server 21 together with the image data.

The information search server 21 searches the building table by using the building identification information of the building that is extracted from the map data based on the position information and the azimuth information. Then, the information search server 21 reads in the floor number of the building from the found building structure information and calculates the distance from the building structure to the digital camera 1 (or the image pickup position) based on the position information of the digital camera 1 and the position information of the building structure.

The information search server 21 calculates height data that represents the height (distance from the ground) at which the image is picked up by the digital camera 1 based on the acquired distance and the elevation angle information and detects the floor number corresponding to the height data calculated based on information (that is stored for each building structure in the building structure table) representing the height of each floor number of the building structure.

Then, as described above, when generating the above-described list data, the information search server 21 lists stores that are housed on the floor close to the height data in the upper positions of the list and gradually lists stores in the direction of the lower position of the list as the stores are located farther from the height data, and transmits the generated list to the digital camera 1.

When receiving the above-described list data as input, the control unit 11 of the digital camera 1 displays the list of store names included in the list data input to the image displaying field MP and displays text data such as "Please select the name of the store you are interested in!" or the like to allow the user to select a store name in the text field T.

Then, the control unit 11 detects a store name selected by the user in the position in which the user touches the image displaying field MP and transmits the store identification information of the store name detected by the user to the information search server 21 through the communication unit 12.

When the above-described store identification information is received as input, the information search server 21 reads out information on a store corresponding to the input store identification information from the building structure table and transmits the read-out search results information to the digital camera 1.

When the search results information is received as input, the control unit 11, as described in Step S8 described above, displays the search results information (related information) in the information displaying field SP.

<Information Search for Image after Picking Up Image by Using Digital Camera 1>

Figure 7:
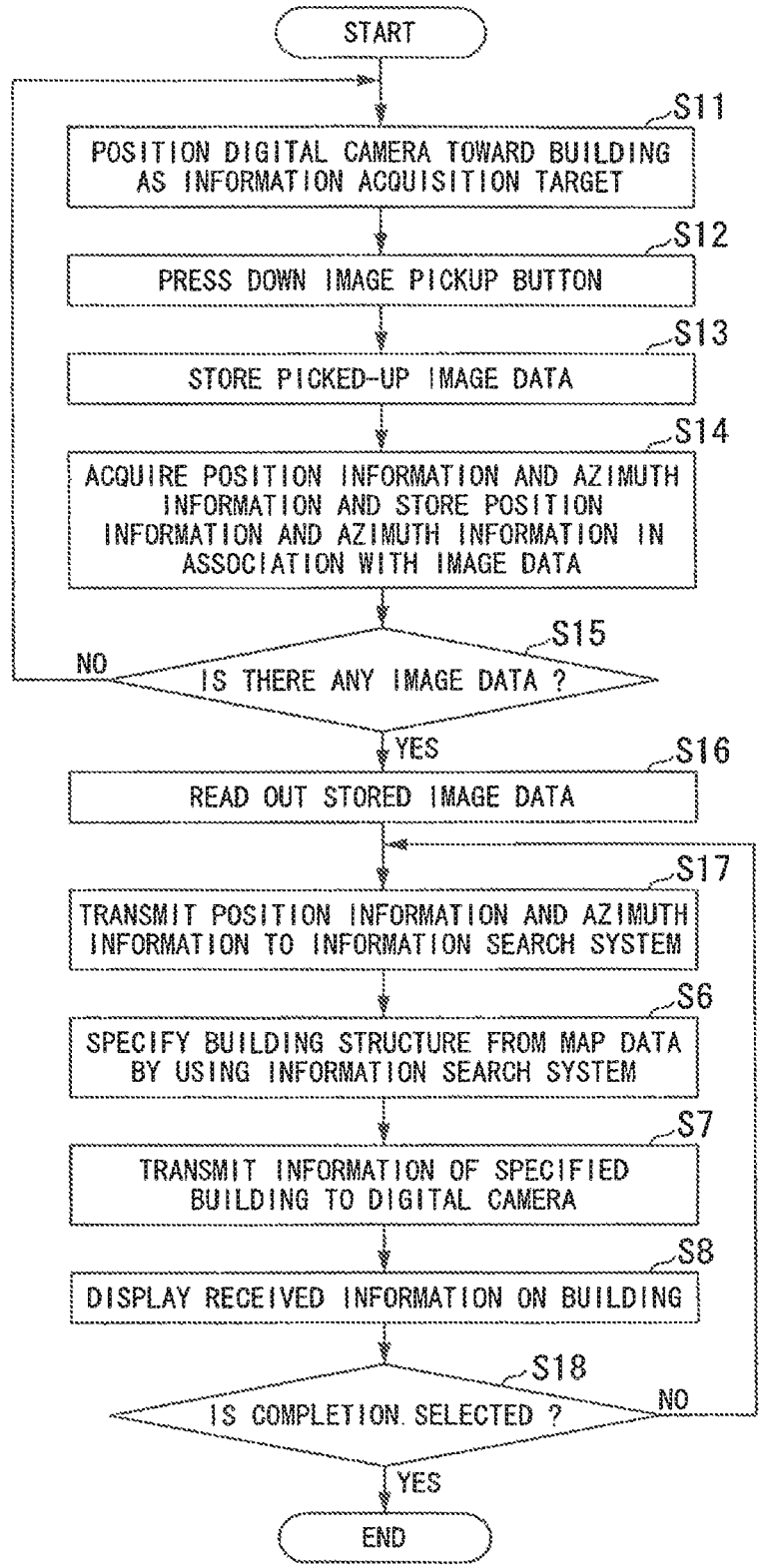
FIG. 7 is a flowchart representing the flow of an information searching process for an image after the image is picked up by a digital camera according to this embodiment.

Next, the operation according to this embodiment will be described with reference to FIGS. 1, 7, and 4 to 6. FIG. 7 is a flowchart representing an operation example of an information searching process according to this embodiment in a case where image data stored in the memory unit 15 is read out after taking an image of a building structure by using the digital camera 1, and the information search for the image data is performed.

In the description below, a case where a user searches for a restaurant while strolling around a street in downtown Shinjuku, picks up image data of several restaurants, and then searches for a restaurant for dining out of the above-described restaurants is presented as an example.

When the user finds a restaurant having an external appearance for which an information search is desired to be performed and positions the digital camera 1 toward the restaurant having a favorite exterior view (Step S11) while strolling around the downtown street, the user presses down the image pickup button B1 (shutter) in the digital camera 1 (Step S12). Here, the control unit 11 displays the image data that is picked up by the image pickup unit 13, that is, the image data of the restaurant of which the image is obtained as shown in FIG. 4, in the image displaying field MP of the display unit 17.

Next, as the user presses down the image pickup button B1, the peripheral circuit outputs a signal indicating pressing-down of the image pickup button to the control unit 11.

Then, the control unit 11 detects the pressing-down of the image pickup button B1 based on the input of the signal indicating pressing-down of the image pickup button B1, assigns the image identification information to the image data of the restaurant of which the image is picked up by the image pickup unit 13, and stores the image data and the time of image pickup in the memory unit 15 in association with the image identification information (Step S13).

Then, the control unit 11 writes the position information acquired by the GPS 14 and the azimuth information acquired by the azimuth sensor 16 when the image pickup button B1 is pressed down in the memory unit 15 in association with the image identification information for storage (Step S14).

Next, when the user performs information collection of the restaurant of which the image is taken, the user touches a read-out icon R of the picked up image. Accordingly the peripheral circuit outputs a signal indicating the selection of the read-out icon R to the control unit 11.

Here, the control unit 11 determines whether an image is stored in the memory unit 15 based on the input of the signal indicating the selection of the read-out icon R (Step S15).

At this moment, when the signal indicating the selection of the read-out icon R is input, the control unit 11 detects the selection of the read-out icon R, and the process proceeds to Step A16 for starting an information search. In addition, the read-out icon R may be a read-out button (not shown). In such a case, it is preferable that the read-out button, similarly to the image pickup button B1, is set up in the main body of the digital camera 1.

On the other hand, when the signal indicating the selection of the read-out icon R has not been input or the image is not stored in the memory unit 15, the control unit 11 returns to Step S11 to perform a new image pickup process.

Then, when receiving the signal indicating the selection of the icon R from the peripheral circuit by the user touching the read-out icon R as input, the control unit 11 sequentially reads out image data from the memory unit 15 in the same order the images thereof were picked up in a time series (Step S16) and displays the image data corresponding to a predetermined number set in advance as thumbnail images (or each image data) in the image displaying field MP through the display unit 17.

In addition, in a case where the thumbnail images do not fit on one page (or one thumbnail image is displayed each time), when the user touches the image displayed in the image displaying field MP so as to be slid in a predetermined direction, a thumbnail image of the previous page or the next page is displayed in the image displaying field MP. At this moment, the control unit 11 displays thumbnail images of the previous page or the next page in the image displaying field MP through the display unit 17 in a case where the signal indicating touching of the image displayed in the image displaying field MP so as to be slid in the predetermined direction is detected.

Next, when the user selects an interesting image of a restaurant, for example, from among the thumbnail images by touching the image and additionally touches the browsing icon I1, the peripheral circuit outputs the signal indicating the selection of the browsing icon I1 together with the selected image identification signal to the control unit 11.

Accordingly, when receiving a signal indicating pressing-down of the browsing icon I1 as input, the control unit 11 reads out the position information and the azimuth information corresponding to the image identification information from the memory unit 15 by using the image identification information of the selected image data and transmits a search request signal including the camera identification information, the position information, and the azimuth information to the information search system 2 through the communication unit 12 (Step S5).

The processes of the following Steps S6 to S8 are the same as those of Steps S6 to S8 represented in FIG. 3, and thus description thereof is omitted here.

Next, the control unit 11 detects whether the completion icon E is selected (Step S18). At this moment, the control unit 11 receives a signal indicating the selection of the completion icon E as input to the peripheral circuit by the user touching the completion icon E, the control unit 11 ends the browsing process. On the other hand, when not receiving the signal indicating the selection of the completion icon E as input, the control unit 11 returns the process to Step S16, and the process of selecting an image from among the thumbnail images is continued.

<Information Search Using Store Information Input to Digital Camera 1>

Figure 8:
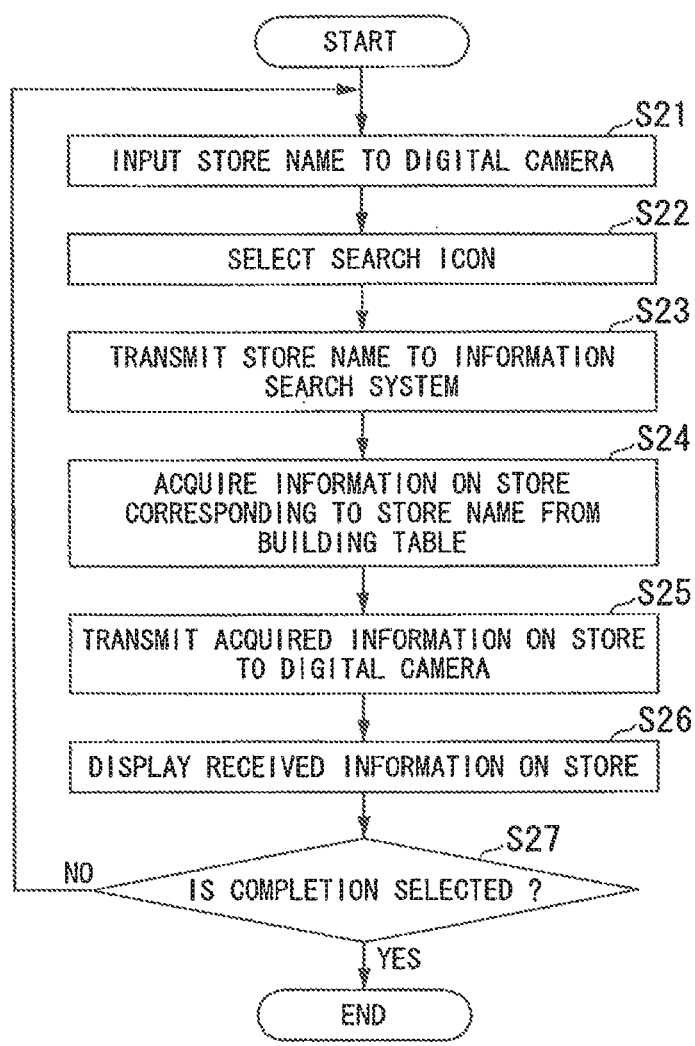
FIG. 8 is a flowchart representing the flow of an information searching process based on store information input to a digital camera according to this embodiment.

Next, the operation according to this embodiment will be described with reference to FIGS. 1, 8, and 4 to 6. FIG. 8 is a flowchart representing an operation example of the information searching process according to this embodiment for a case where an information search is desired to be performed by the user's inputting a store name to the digital camera 1 for a restaurant or the like having the input store name from the building structure table, represented in FIG. 2, corresponding to the store name that is stored in the database 22.

In the following description, for example, is a case where information on a restaurant in Harajaku from a known person is checked.

When the user selects a search icon I5 by touching it, the peripheral circuit outputs a signal indicating the selection of the search icon I5 to the control unit 11. Accordingly, the control unit 11 detects the selection of the search icon I5 based on the input of the signal indicating the selection of the search icon I5 and displays the input field IP as shown in FIG. 6 in a part of the image displaying field MP through the display unit 17.

Then, the user writes the store name of the restaurant desired to be searched for in the text field T of the input field IP by using the touch screen-type keyboard section K (Step S21) and touches the search icon I5 again (Step S22).

Accordingly, the peripheral circuit outputs text data of the store name that has been input to the text field T together with the signal indicating the selection of the search icon I5 to the control unit 11.

Then, the control unit 11 detects the selection of the search icon I5 based on the input of the signal representing the selection of the search icon I5, reads in the text data of the store name that has been input to the text field T, and transmits the search request signal together with the camera identification information to the information search system 2 through the communication unit 12 (Step S23).

Next, when receiving the search request signal, the information search server 21 reads out the information (the store information and each information represented in the table represented in FIG. 2) on the building structure (store) corresponding to the store name from the building structure table of the database 22 (Step S24).

After reading in the store information, the information search server 21 transmits the acquired store information to the digital camera 1 (Step S25).

When receiving the store information through the communication unit 12, the control unit 11 displays building information in the information displaying field SP together with displaying the image data of the periphery of the store that is included in the building information in the image displaying field MP represented in FIG. 5 through the display unit 17 (Step S26). For example, the type (Chinese, Japanese, French, Italian, or the like) of the restaurant, the telephone number, and the like are displayed.

In addition, when the user selects a CM icon I2 by touching the CM icon I2, the control unit 11 detects the selection of the CM icon I2 and displays commercial information (menu, the chef's daily special, or the like) of the restaurant included in the search results information in the information displaying field SP through the display unit 17.

In addition, when the user selects the post browsing icon I3, by touching the post browsing icon I3, the peripheral circuit outputs a signal representing the selection of the post browsing icon I3 to the control unit 11.

The control unit 11 detects the selection of the post browsing icon I3 based on the input of the signal indicating the selection of the post browsing icon I3 and displays the posted information written by other users which is included in the search results information in the information displaying field SP through the display unit 17.

When there is a plurality of the posted information, the control unit 11 sequentially displays the plurality of the posted information in the information displaying field SP through the display unit 17. In addition, when image data is also included in the posted information, the control unit 11 displays the image data in the information displaying field SP through the display unit 17.

Then, the control unit 11 detects whether the completion icon E has been selected (Step S27). The detection of the selection of the completion icon E is the same as the process of Step S9 in "<Information Search of Image Picked up by Digital Camera 1>", and thus, description thereof is omitted here.

Then, when receiving the signal indicating the selection of the completion icon E as input by user's touching the completion icon E from the peripheral circuit, the control unit 11 ends the browsing process. On the other hand, when not receiving the signal indicating the selection of the completion icon E, the control unit 11 returns the process to Step S21 so as to continue to perform an information search for the store.

<Update Process of Database 22>

In a case where the building information stored in the building table of the database 22 becomes old due to a change in the exterior of a store, rebuilding of the building structure, or the like, data of the corresponding building is updated as follows.

As described above, when the position information, the azimuth information, and the image data are received from the digital camera 1 as input, the information search server 21 extracts the corresponding building structure identification information from the map data based on the position information and the azimuth information and performs an image recognizing process by comparing the characteristic amounts of images of the peripheral image data of the building from the building table on the basis of the building identification information with the input image data.

However, in a case where there is no similarity between the building of the peripheral image data and the building of the image data, the information search server 21 transmits text data such as "Corresponding building structure could not be found. Please input different image data!" to the digital camera 1.

Accordingly, the control unit 11 displays the input text data in the information displaying field SP.

In addition, in a case where image data of a building structure different from the image data transmitted from the user is registered in a position representing the same position information in the building structure table, the image data is written in the position represented by the same position information in the building structure table, and accordingly, the information search server 21 registers modification flag information (for example, a number of "one" or the like) indicating the necessity of modification of the image data in a modification flag entry disposed for each building structure in the building structure table.

Then, the information search server 21 extracts an address from the map data (a correspondence table between the position information of the latitude and the longitude stored in the map data and an address) based on the position information of the building structure corresponding to the modification flag information registered in the building structure table for each modification period of the building structure table that is set in advance. When the address is extracted, the information search server 21 acquires latest information on the building structure corresponding to this address, that is, the store information on a store housed in the building structure from an address-building structure searching system on the Web or the like and updates the building structure table. This operation may be performed by a building table supervisor's searching for a building structure of an address based on the above-described address acquired from the map data by using a search system on the Web, searching for a store housed in the building structure, and updating the building structure data based on the search results. In addition, the image data of a building structure may be updated by using the image data transmitted from the user.

Based on the above-described configuration, each type of information (building structure name, the building structure information, the image data of a developed object, and the like) in the building structure table can be updated with the latest information at any time.

<Effective Use 1 of Browsed Information>

The information search server 21, for the store information of each found store in the building structure table, may be configured to search for similar information about a similar store (a store selling the same product or a restaurant of the same genre) located near (for example, within a circular area having the radius of 1 km) the store from the building structure table. In such a case, the information search server 21 associates the building structure identification information of the similar store with the store name of the similar store corresponding to the found store and a distance from the found store and transmits the store name of the similar store and the distance to the digital camera 1.

Accordingly, the control unit 11 displays a combobox of a list of store names of similar stores and the distances from the store that have been input from the information search server 21 in the image displaying field MP through the display unit 17.

Then, the control unit 11 transmits the building structure identification information of the store that is selected from the combobox of the above-described list by being touched by the user to the information search server 21.

When receiving the building structure information of the store selected by the user as input, the information search server 21 reads out the building structure information corresponding to the input building structure identification information and transmits the read-out information to the digital camera 1 as the search result information.

When receiving the above-described building structure information as input, the control unit 11, similarly to the display in the above-described "<Searching for Information on Image Picked Up By Digital Camera 1>", displays the building structure information of the input similar store in the information displaying field SP through the display unit 17.

<Effective Use 2 of Browsed Information>

The information search server 21 registers history of the store identification information requested to be searched for by the user from the digital camera 1 in a user registration table of the database 22 in association with the camera identification information, for each camera identification information (for each user).

In such a case, the information search server 21 detects the genre (in this case, the genre of each store is stored in the building structure table) of the store in correspondence with the store identification information and registers the genre in the user registration table in association with the camera identification information of the user registration table together with information on the number of times of the detected genre. In addition, a genre with a large number of detected times is set as preference information for which the user has great interest.

In addition, in the above-described "<Effective Use 1 of Browsed Information>", when the store information (similar information) of the similar store is transmitted to the digital camera 1, the information search server 21 reads out the genres in rank order set as the user history corresponding to the camera identification information of the digital camera 1 that has transmitted the search request, for example, the first to fifth genres in the descending order of the number of times of searched genres, as the preference information. When searching for a similar store based on the store information, the information search server 21 may be configured to search for a similar store of a genre corresponding to the preference information. Accordingly, in this embodiment, a similar store with higher accuracy for matching the user's preference can be provided, compared to the case of ""<Effective Use 1 of Browsed Information>".

<Charging Process for Store Registered in Database 22>

In a case where the above-described building structure is a store (including a restaurant, or a company), the building structure table of the database 22 may be configured such that discount coupon data is stored for each store.

In addition, the information search server 21 transmits the search results information to which the discount coupon information is added to the digital camera 1.

When the user goes dining or shopping by using the discount coupon information, the information search server 21 detects whether the user has dined or shopped based on whether the discount coupon information has been used. For example, in a case where the above-described coupon information is a bar code (including a two-dimensional bar code) or the like displayed in the information displaying field SP of the digital camera 1, a reading unit of the store reads out the bar code and transmits use information indicating the use of the discount coupon information together with the camera identification information, which is transmitted from the digital camera 1, and shopping (or dining) charge to the information search system 2.

Accordingly, when receiving the use information, the information search server 21 reads out the history information corresponding to the camera identification information added to the use information from the database 22 and charges the store with an information providing fee depending on the level of information use out of a level in which the store is used by performing an information search, a level in which the store is used by viewing the provided information on the store, and a level in which the store is used by viewing the posted information, that is, the degree of use of the information of the database 22. In addition, the information search server 21 writes the level of the information search and the history of the use of the discount coupon information for each item of camera identification information in the history table that is stored in the database 22.

This bar code includes the building structure identification information that represents a store. In the database 22, a charge table, in which the charging history and an accumulated charging value corresponding to each store are stored in association with the building construction identification information, is set up.

Then, the information search server 21 writes the amount of usage and a charge corresponding to the level of information use as the history in the charge table in association with the building structure identification information and adds the new charge to the accumulated value so as to update the accumulated value.

<Process of Adding Points to User>

Each time the user uses the discount coupon information at the store, the information search server 21 calculates points corresponding to the amount of usage (for example, calculated by multiplying the amount of usage by a point coefficient) for a case where the discount coupon information is used and accumulates the calculated points in the user registration table of the database 22 in association with the camera identification information.

In addition, the information search server 21 accumulates points corresponding to a value set in advance for a user who has transmitted the posted information in the user registration table in association with the camera identification information.

The above-described points can be used, instead of money, together with the discount coupon information in paying the charge.

<Display Order of Posted Information>

Here, the information search server 21 may be configured to allow the digital camera 1 to transmit a nickname and a title as the posted information together with the post identification information in the initial stage.

Then, the control unit 11 initially displays only a plurality of nicknames and a plurality of titles in the information displaying field SP. Then, the user selects the nickname and the title of the posted information desired to be known from among the plurality of nick names and titles displayed by touching the nick name and the title of the posted information. Accordingly, the peripheral circuit transmits a signal indicating the selection nickname and title and the post identification information of the selected posted information to the control unit 11.

Accordingly, the control unit 11 transmits a posted information transmission request together with the post identification information to the information search system 2.

Accordingly, the information search server 21 transmits the text data and the image data (the entire posted information) corresponding to the transmitted post identification information to the digital camera 1.

Here, the information search server 21 assigns the positing identification information that is used for identification for each of the posted information and writes the posted information in the user registration table in association with the camera identification information for storage.

In addition, in this embodiment, the control unit 11 may be configured to display the text data in the information displaying field SP and display the image data in the image displaying field MP when receiving the text data and the image data from the information search system 2 through the communication unit 12.

In addition, the information search server 21 searches for the post identification information corresponding to the referred posted information from the user registration table and increments the number of references for the camera identification information corresponding to the post identification information in the user registration table.

Then, in the initial display stage of the nickname and the title in which the user can select the posted information, the information search server 21 transmits a display list, in which the nicknames and the titles are displayed in the descending order of the number of times of the selection of the posted information, that is, the nickname and the title having a larger number of references comes first to be displayed in the information displaying field SP to the digital camera 1.

Accordingly, the control unit 11 sequentially displays the nicknames and the titles in the information displaying field SP in accordance with the display list.

<Process of Displaying Past Image Data>

In addition, according to this embodiment, the database 22 may be configured to have a past image table in which image data acquired by photographing buildings and landscapes at each latitude and each longitude are photographed each year is stored in association with the latitude and the longitude.

When the user selects the past image icon I6 by touching the past image icon I6, the above-described peripheral circuit outputs a signal indicating the selection of the past image icon I6 to the control unit 11.

Accordingly, the control unit 11 detects the selection of the past image icon I6 based on the input of the signal indicating the selection of the past image icon I6 and displays an input field IP as represented in FIG. 6 in a part of the image displaying field MP through the display unit 17.

Then, after writing the year (for example, the dominical year) in the text field T by using the touch screen-type keyboard section K, the user touches the past image icon I6 (or the browsing icon I1).

Accordingly, the peripheral circuit transmits the text data of the year together with the signal indicating the selection of the past image icon I6 to the control unit 11.

When detecting the signal indicating the selection of the past image icon I6, the control unit 11 reads in the text data representing the year written in the text field T.

After reading in the data for the year, the control unit 11 transmits the past image search request together with the read year, the position information, the azimuth information, and the camera identification information to the information search system 2.

Next, in the information search system 2, the information search server 21 selects the past image table corresponding to the latitude and the longitude on the basis of the position information of the building structure that is received from the digital camera 1 and is displayed in the image displaying field P. Then, the information search server 21 reads in the image data corresponding to the azimuth information and the year in the selected past image table and transmits the read image data to the digital camera 1. The digital camera 1 displays the image data corresponding to the year received from the information search server 21 in the image displaying field MP through the display unit 17. In addition, in a case where the information or the like for the read-out image is added, the information search server 21 transmits the added information together with the read-out image data to the digital camera 1.

Accordingly, the user can acquire information indicating if there is any specific building for each year in the past or there is only a landscape without any building structure for each year in the past.

Here, when the past image table of the corresponding latitude and the longitude cannot be found, the information search server 21 searches for the past image table that is located at the latitude and the longitude in the direction of the azimuth information and that is closest to the latitude and the longitude and extracts image data therefrom.

In addition, for an era without a photo, a landscape picture that had lasted in the era or CG (computer graphics) image data of generated by imagination may be stored for each year in the past image table of the memory unit 15 in association with the year, instead of the image data of a photo.

Second Embodiment

Figure 9:
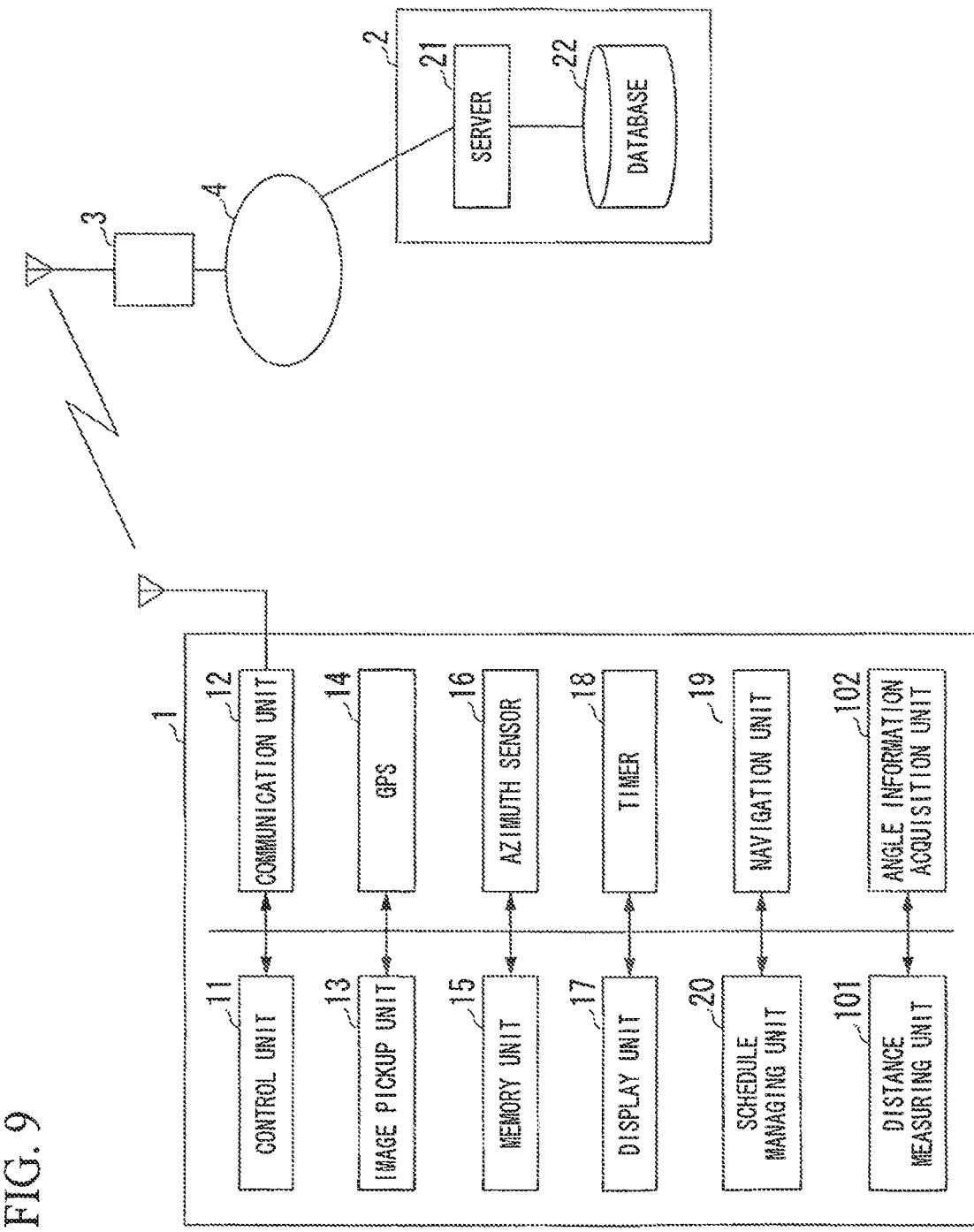
FIG. 9 is a block diagram representing a configuration example of an information acquisition system according to another embodiment of the present invention.

FIG. 9 is another embodiment of the present invention in which a schedule managing function is implemented in the information acquisition system shown in FIG. 1. To each configuration that is the same as or equivalent to that of the first embodiment, the same reference sign is assigned. Hereinafter, a configuration that is different from the first embodiment and the operation thereof will be described. The second embodiment is obtained by adding the following functions to the first embodiment.

A navigation unit 19 performs a route search through the information search server 21 based on a departure point, a destination, a departure time (or arrival time), schedules at the destination, and the like that are input by the user and performs a reservation process of transportation or an accommodation facility along the route.

A schedule managing unit 20 notifies the user of each time through a buzzer (or vibration) or speech (or music) in correspondence with a meeting time and dining time that are input by the user and the departure time and the arrival time of the transportation reserved by the navigation unit 19.

<Schedule Managing Function>

Figure 10:
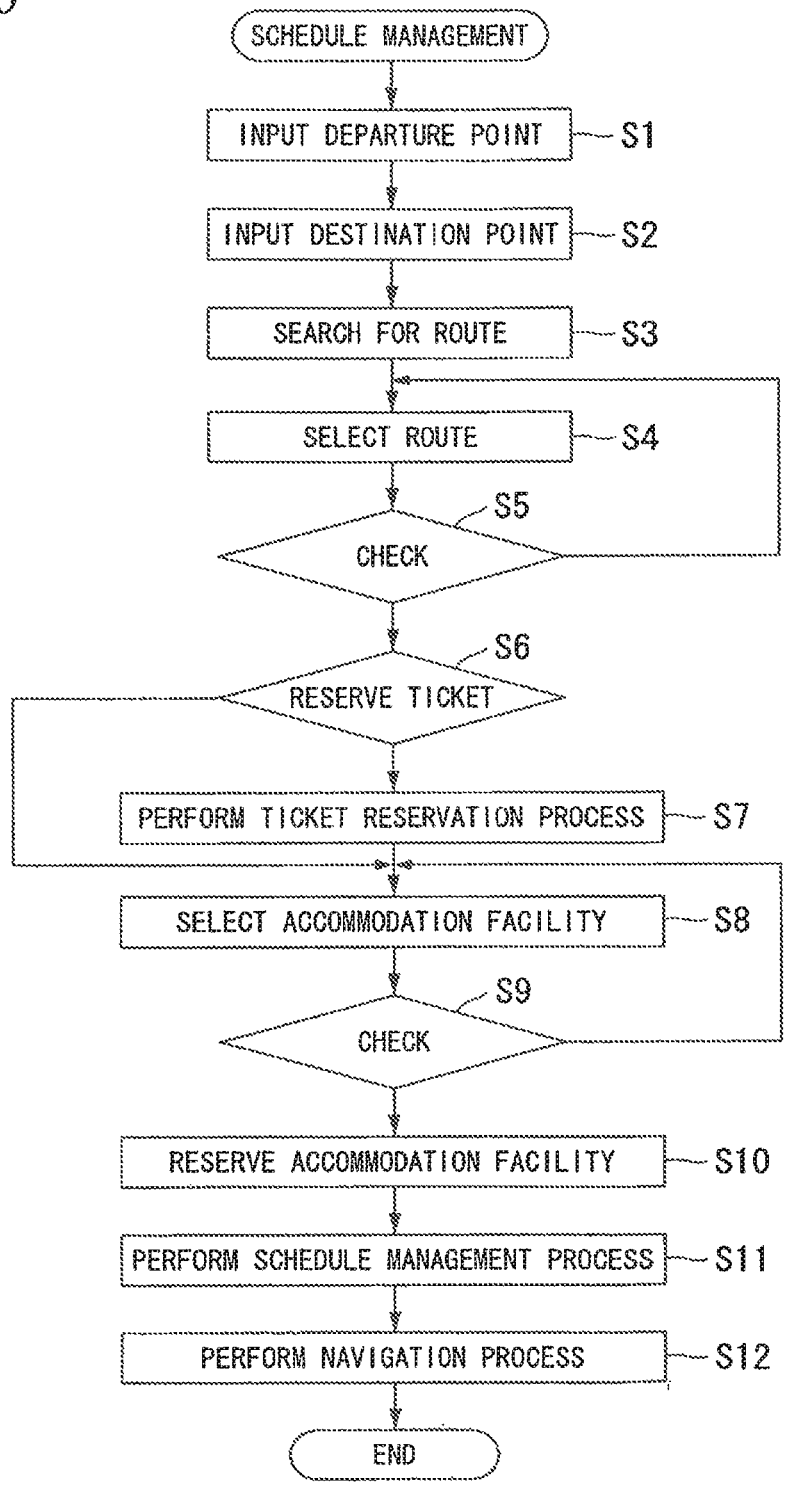
FIG. 10 is a flowchart representing the flow of an information searching process based on destination information input to a digital camera according to this embodiment.

Hereinafter, the operation of the schedule managing function of an information acquisition system according to the second embodiment will be described with reference to FIGS. 9 and 10. FIG. 10 is a flowchart representing an example of the operation of a schedule managing process of the above-described information acquisition system.

Figure 11:
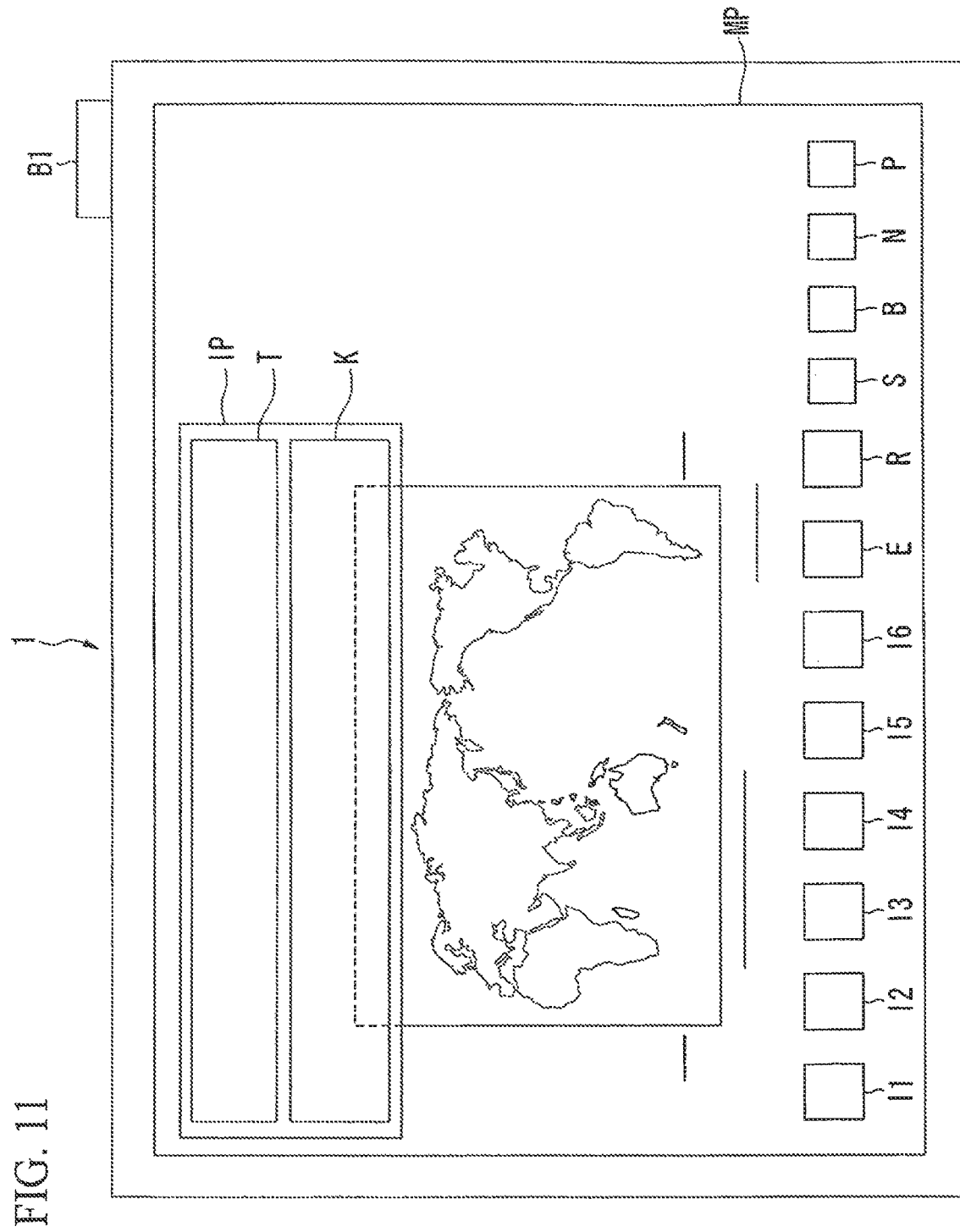
FIG. 11 is a conceptual diagram showing a configuration example of an image displayed in an image displaying field according to a second embodiment.

When a user starts the operation of the digital camera 1 for performing a route search and a reservation of transportation, the control unit 11 displays image data on an input screen shown in FIG. 11 in the image displaying field MP via the display unit 17.

When the user touches a route search icon B, the control unit 11 detects the touch on the route search icon B and outputs a control signal to start a navigation process to the navigation unit 19.

Accordingly, the navigation unit 19 displays a notification directing the user to input a departure point in the text field T in the image displaying field MP.

Then, the user inputs and confirms the place name of the departure point by using a touch screen-type keyboard unit K (Step S1). Here, "confirm" means confirming an input by touching a confirmation key in the touch screen-type keyboard unit K.

In addition, at this time, a configuration in which the user sets a company, the home, and the like as the departure points in advance, candidates for the departure point are read out from a departure point table of the memory unit 15 and are displayed in the image displaying field MP as a combobox by the navigation unit 19, and the user selects any one of a plurality of departure points on the screen may be used.

Here, as a registration process of the departure point, when the user touches a registration icon P, the control unit 11 displays a combobox for checking the type of data to be registered in the image displaying field MP.

Then, when the user selects a departure point from the above-described combobox, the control unit 11 displays a notification directing the user to input a place name in the text field T in the image displaying field MP. As the place name is input to the text field T and confirmed by the user using the touch screen-type keyboard unit K, the control unit 11 stores the place name input to the text field T in the departure point table of the memory unit 15.

When the departure point is input, the navigation unit 19 transmits a search request to the information search server 21 together with the departure point and the camera identification information thereof.

Then, the information search server 21 reads out image data of a world map for selecting a destination from the database 22 and transmits the image data to the digital camera 1 as designation search data together with country identification information corresponding to the regions of countries of the world map.

When the image data of the world map is input, the navigation unit 19 displays the input world map in the image displaying field MP together with a notification for urging the user to input a destination.

When the user touches a country on the world map in which the destination is located, the navigation unit 19 detects the touched region of the world map and transmits country identification information of the country corresponding to the region to the information search server 21.

When receiving the country identification information as input, the information search server 21 reads out the image data of a domestic map corresponding to the country identification information, for example, the image data of a Japanese map from the database 22 for a case where the user selects Japan and transmits the image data to the digital camera 1 together with region identification information that represents each region (for example, the administrative divisions of Japan in the case of Japan, states in the case of U.S.A., provinces in the case of China, or the like) as a unit.

When receiving the image data of the domestic map as input, the navigation unit 19 displays the input domestic map, for example, the Japanese map in the image displaying field MP together with a notification directing the user to input a destination.

When the user touches a region in which the destination is located in the above-described Japanese map, the navigation unit 19 detects the touched region of the domestic map and transmits information for each region of the administrative divisions corresponding to the region to the information search server 21.

When receiving the region identification information as input, the information search server 21 reads out the image data of the domestic map corresponding to the region identification information, for example, the image data of "Miyagi Ken" as a regional map based on the region identification information of "Miyagi Ken" for a case where the user selects "Miyagi Ken" in the Japanese map from the database 22 and transmits the image data to the digital camera 1 together with minimum unit identification information that represents each minimum unit (for example, city, town, and village in the case of Japan, city and street in the case of U.S.A., city and village in the case of China, or the like) and data directing the user to input any one of departure time or arrival time. Here, the above-described region identification information is set in correspondence with each region of the image data of the Japanese map displayed in the image displaying field MP. As the user touches the region, the navigation unit 19 reads in the region identification information that is set in correspondence with the touched region of the image data.

When the image data of the regional map is input, the navigation unit 19 displays the input regional map, for example, the map of "Miyagi Ken" in the image displaying field MP together with a notification for urging the user to input a destination.

When the user touches the minimum unit in which the destination is located in the above-described Miyagi Ken map, the navigation unit 19 detects a touched region of the Miyagi Ken map as the minimum unit and detects the minimum unit identification information of the region.

Then, when the user writes the departure time or the arrival time (for example, "From" is written for the departure time, and "To" is written for the arrival time for identification) including a date in the text field T and confirms the departure time or the arrival time by using the touch screen-type keyboard unit K, the navigation unit 19 transmits route information that includes at least the minimum unit identification information of the city, the town, and the village selected by the user and time information representing the date and time of the departure or arrival to the information search server 21 (Step S2).

When the minimum unit identification information is input as the destination, the information search server 21 transmits the map data of the minimum unit, for example, the map data of Sendai-shi as the destination for a case where the minimum unit identification information represents Sendai-shi to the control unit 11 of the digital camera 1.

When receiving the map data as input, the control unit 11 displays the input map data in the image displaying field MP.

Then, when the user touches a destination (a building or the like) as a target, the control unit 11 reads out the position information of the place touched by the user from the map data and transmits the read-out position information to the information search server 21 together with the camera identification information. At this time, the control unit 11 acquires the position information from the GPS and transmits the user's position information to the information search server 21 together with the position information read out from the map data and the camera identification information.

The information search server 21 searches for a station located near the user's destination based on the above-described position information read out from the input map data and searches for a station located near the departure point within a range that is set in advance from the user's current location based on the map data stored in the database 22. Then, the information search server 21 performs a route search of transportation (an airplane, a train, a bus, a taxi, a ship, and the like) between the destination station (for example, a station that is located closest to the destination or the like) located in Sendai-shi as the destination and a departure station set as the departure point (Step S3).

The information search server 21 searches for the above-described route between the departure station and the destination station based on the date and the departure time (or the arrival time) for the database 22 in which information on the route is stored or a transportation route search system.

The information search server 21 transmits the route (the route includes the departure time, the arrival time, and fare information of the transportation; there are cases where there is a single route or a plurality of routes, and hereinafter, a case where there is a plurality of routes will be described) between the departure station and the destination station that can be acquired from the route search system to the digital camera 1 as information on the route by assigning route identification information to each route.

When the search result of the route is input, the navigation unit 19 displays the departure station, the destination station, the departure time, the arrival time, and the fare for each route in the image displaying field MP through the display unit 17.

For example, the user selects a route of a time that is convenient to the user by touching the route (Step S4). Then, the navigation unit 19 detects the route touched by the user and displays a notification for checking whether the selected route is correct in the image displaying field MP by changing the display color of the detected route (Step S5).

In order to check the user's selection of the route, the navigation unit 19 displays text information of "YES" and "NO" regarding whether the selected route is good or not and displays a notification for touching "YES" for a case where the selected route is good and touching "NO" for a case where the selected route is not good (a case where a different route is desired to be selected) in the image displaying field MP.

Here, when detecting a user's touch on "YES", the navigation unit 19 allows the process to proceed to Step S6. On the other hand, when detecting the user's touch on "NO", the navigation unit 19 returns the process back to Step S4.

When detecting the user's touch on "YES", the navigation unit 19 checks whether or not a reservation for the transportation on the route is performed (Step S6).

Here, the navigation unit 19, for example, displays text information of "YES" and "NO" and displays a notification for touching "YES" for making a reservation and touching "NO" for not making a reservation in the image displaying field MP, and thereby checking whether to make a reservation for the user.

Here, when detecting a user's touch on "YES", the navigation unit 19 transmits the route identification information of the route selected by the user to the information search server 21 and allows the process to proceed to Step S7. On the other hand, when detecting a user's touch on "NO", the navigation unit 19 allows the process to proceed to Step S8.

When the route identification information (information on the route) of the route selected by the user is input, the information search server 21 performs a reservation process of each transportation on the route represented by the route identification information (Step S7).

In the information on the route, the departure time (including a date) of the vehicle departing from the departure station and arrival time (including a date) of the transportation arriving at the destination station are included as information. In addition, in a case where there is a transfer in the route information, departure time (including a date) of transportation for the transfer at a transfer station is also included as information in the information on the route.

Here, the information search server 21 transmits image data for checking preference information for a vehicle for smoking or a vehicle for non-smoking and a window seat or an aisle seat to the digital camera 1. At this time, the information search server 21 assigns combination identification information to each of combinations of four methods of a vehicle for smoking, a vehicle for non-smoking, the window side, and the aisle side and transmits the combination identification information to the digital camera 1 together with the image data.

When the image data and the combination identification information are input, the navigation unit 19 displays a combobox of combinations of four methods of a vehicle for smoking, a vehicle for non-smoking, the window side, and the aisle side in the image displaying field MP and displays a notification directing the user to select any one of them in the image displaying field MP.

When the user selects any one of the combinations of four methods, the navigation unit 19 detects a combination that is selected by the user and transmits a combination identification signal corresponding to the combination to the information search server 21.

When receiving the combination identification information as input, the information search server 21 performs a reservation process by using reservation systems on the home pages of each transportation company to be used. In addition, in a case where a ticketless reservation (for example, check-in or ticketing can be performed by using a cellular phone or the like without any ticket) can be made for the above-described reservation system, the information search server 21 performs the reservation process in a ticketless manner. At this time, the information search server 21 transmits image data for checking how the user pays a reservation fee to the digital camera 1.

Then, when the image data for checking how to pay the reservation fee is input, the navigation unit 19, for example, displays a combobox for selecting a payment method such as credit payment, wire transfer to a bank, or cash on delivery in the image displaying field MP.

When the user selects the credit card payment by touching a credit card from the above-described combobox, the navigation unit 19 detects the user's selection of the credit card payment and displays a notification directing the user to input a credit card number to the text field T by using the touch screen-type keyboard unit K in the image displaying field MP.

Then, when detecting that the credit card number is input to the text field T and is confirmed, the navigation unit 19 adds the camera identification information of the digital camera 1 to the credit card number written into the text field T and transmits the credit card number to the information search server 21.

When receiving the credit card number and the camera identification information, the information search server 21 transmits the credit card number to the reservation system of each transportation company, and thereby performing a payment process of the fee.

In addition, in this embodiment, the information search server 21 performs the reservation process by using the reservation system on the home page regarding each transportation. However, the reservation process is not limited thereto. For example, the information search server 21 may be configured to perform a reservation process by transmitting items (for example, route information, a credit card number, and the like) required for a reservation to the reservation system (for example, a server or the like of the reservation system regarding transportation).

In addition, in this embodiment, after the route is selected in the above-described Step S4 or Step S5, the process may proceed to Step S7 by omitting Step 6. In such a case, after the route is selected in Step S4 or Step S5, the information search server 21 automatically makes a reservation for each transportation on the basis of the route for the reservation system of the transportation (Step S7).

In addition, in this embodiment, after the route information is input from the digital camera 1 in the above-described Step S2, the process may be configured to proceed to Step S8 by changing the above-described Steps S4 to S7 as follows. After the route information is input from the digital camera 1 in the above-described Step S2, the information search server 21 performs a search for the route of the corresponding transportation from the database 22 or a route search system of the transportation based on the input route information. Next, the information search server 21 performs a reservation process of the transportation in the corresponding route based on the information on the route as the search result and the preference information of transportation that is stored for each item of camera identification information in the database 22. Then, the information search server 21 transmits the information on the route and reservation information (for example, the name of the transportation, time information, a fare, and the like) of the corresponding transportation to the digital camera 1. Here, the preference information of the transportation includes information on whether time is prioritized or fare is prioritized, preference for a designated seat or a free seat, preference for smoking or non-smoking, and the like for the reservation of the transportation. In addition, when transmitting the information of the route and the reservation information of the transportation to the digital camera 1, the information search server 21 may be configured to make a notification for performing a payment process of the reservation fee of the transportation or the like.

Next, the information search server 21 extracts accommodation facilities located near the destination including the destination station, for example, from a search system of accommodation facilities on the web or the database 22 in which accommodation facility information is stored.

Then, the information search server 21 assigns an accommodation facility identification number to each accommodation facility, adds information such as the name of the accommodation facility, an address, the distance from a station, the fare, periphery information, and a telephone number of the accommodation facility identification number, and transmits the above-described information as the accommodation facility information to the digital camera 1.

When the above-described accommodation facility information is input, the navigation unit 19 displays a combobox in which the accommodation facility information is displayed for each accommodation facility in the image displaying field MP.

For example, the user selects an accommodation facility that is convenient to the user by touching the accommodation facility (Step S8). Then, the navigation unit 19 detects the accommodation facility touched by the user and displays a notification for checking whether the selected accommodation facility is correct in the image displaying field MP by changing the display color of the detected accommodation facility (Step S9).

In order to check the user's selection of the accommodation facility, the navigation unit 19 displays text information of "YES" and "NO" regarding whether the selected accommodation facility is good or not and displays a notification for touching "YES" for a case where the selected accommodation facility is good and touching "NO" for a case where the selected accommodation facility is not good (for example, the user does not like the accommodation facility) (a case where a different accommodation facility is desired to be selected) in the image displaying field MP.

Here, when detecting a user's touch on "YES", the navigation unit 19 allows the process to proceed to Step S10 for a reservation for the accommodation facility selected by the user. On the other hand, when detecting the user's touch on "NO", the navigation unit 19 returns the process back to Step S8.

When the accommodation facility identification information, to which the accommodation facility identification number of the accommodation facility selected by the user and the like are added, is input, the information search server 21 performs a reservation process of the accommodation facility represented by the input accommodation facility identification information (Step S10).

In other words, the information search server 21 performs a reservation process by using a reservation system on the home page of each accommodation facility and transmits image data for checking how the user pays the fee to the digital camera 1.

Then, when the above-described image data for checking is input, the navigation unit 19, for example, displays a combobox for selecting a payment method such as credit payment, wire transfer to a bank, or cash on delivery in the image displaying field MP.

When the user selects the credit card payment by touching a credit card from the above-described combobox, the navigation unit 19 detects the user's selection of the credit card payment and displays a notification directing the user to input a credit card number in the text field T by using the touch screen-type keyboard unit K in the image displaying field MP.

Then, when detecting that the credit card number is input to the text field T and is confirmed, the navigation unit 19 adds the camera identification information of the digital camera 1 to the credit card number written into the text field T and transmits the credit card number to the information search server 21.

When receiving the credit card number and the camera identification information, the information search server 21 transmits the credit card number to the reservation system of each accommodation facility, and thereby performing a processing of the fee.

In addition, in this embodiment, the information search server 21 performs the reservation process by using the reservation system on the home page of each accommodation facility that is indicated by the input accommodation facility identification information. However, the reservation process is not limited thereto. For example, the information search server 21 may be configured to perform a reservation process by transmitting items (for example, a credit card number and the like) required for a reservation to the reservation system (for example, a server or the like of the reservation system of the accommodation facility) of the accommodation facility represented by the input accommodation facility identification information.

When the user touches a schedule icon S for setting time for a meeting or a dining, the control unit 11 detects the touch on the schedule icon S and outputs a control signal for starting a schedule setting process to the schedule managing unit 20.

The schedule managing unit 20 transmits request information for schedule management to the information search server 21.

When receiving the request information as input, the information search server 21 transmits image data for displaying a combobox for performing input of schedule management to the digital camera 1.

When the above-described image data is input, the schedule managing unit 20 displays a combobox for inputting a scheduled item, a place (including an address), a start date and time, an end date and time for each schedule configuring a table (schedule table) shown in FIG. 12 in the image displaying field MP and displays a notice directing the user to input a schedule by using the touch screen-type keyboard unit K.

When the user writes and confirms a planed item, a place (including an address), the start date and time, an alarm time 1 of the start date and time, an end scheduled date and time, and an alarm time 2 of the end schedules date and time for each schedule in the combobox configuring the table as shown in FIG. 12, the schedule managing unit 20 adds the camera identification information of the digital camera 1 thereto and transmits schedule information written into the above-described combobox to the information search server 21. The above-described alarm time will be described later.

When the above-described schedule information is input, the information search server 21 stores the schedule information in association with the camera identification information in the schedule table (FIG. 12) of the database 22.

Next, when registration of the schedule table in a schedule table of the database 22 is completed, the information search server 21 transmits image data for displaying a combobox in a table format shown in FIG. 13 for performing input of schedule management to the digital camera 1.

When the above-described image data is input, the schedule managing unit 20 displays a combobox for inputting the types of airplane, train, or bus and the departure time, an alarm time 3 for the departure time, arrival time, and alarm time 4 for the arrival time for each type on the route of the transportation configuring the table shown in FIG. 13 in the image displaying field MP and simultaneously displays a notification directing the user to input a schedule in the combobox by using the touch screen-type keyboard unit K.

When the user writes and confirms the types of transportation for each transportation, the departure time, the alarm time 3 for the departure time, arrival time, and alarm time 4 for the arrival time for each type in the combobox configuring the table as shown in FIG. 13, the schedule managing unit 20 adds the camera identification information of the digital camera 1 thereto and transmits the transportation information written into the combobox to the information search server 21.

When receiving the above-described transportation information as input, the information search server 21 stores the transportation information in the reservation table (FIG. 13) of the database 22 in association with the camera identification information.

Next, the operations of the user and the information acquisition system according to this embodiment performed on a date (for example, a date for a business trip or a tour) for which the transportation is reserved will be described. When a user starts the operation of the digital camera 1 and touches a navigation icon N on a displayed screen shown in FIG. 11 so as to request for guiding a route, the control unit 11 detects the touch on the navigation icon N and outputs a control signal for starting a navigation process to the navigation unit 19. At this time, the schedule managing unit 20 starts to operate based on the schedule table shown in FIG. 12.

Then, the schedule managing unit 20 transmits request information for requesting to search whether there is scheduled data (scheduled record), in which a scheduled start date and time corresponding to the date is written, in the schedule table and whether there is reservation data (a reservation record) in which a departure time corresponding to the date is written in the reservation table to the information search server 21 with the date and the camera identification information being assigned thereto.

When receiving the above-described request signal as input, the information search server 21 extracts scheduled data and reservation data that correspond to the input camera identification information from the schedule table and the reservation table of the database 22. The information search server 21 transmits the scheduled data and the reservation data that have been extracted to the digital camera 1.

Then, the schedule managing unit 20 stores the scheduled data and the reservation data, which are input from the information search server 21, in the memory unit 15.

Here, the user's position (the position of the digital camera 1) is detected by the navigation unit 19 by using the GPS 14 disposed in the digital camera 1. In this embodiment, the navigation unit 19 guides the user's route up to the destination by using the user's position detected by the GPS 14, the schedule table, and the reservation table.

In a case where a user must transfer between different platforms in a station or the like, transfer trains between stations of different railroads which are located far away from each other, transfer between transportation such as train, or the like, the navigation unit 19 reads out the arrival time at which the train arrives at a connecting station from the reservation table, reads out moving image data of a route for movement between the platforms or a route of movement between different stations from the database 22, and temporarily stores the arrival time and the moving image data in the memory unit 15. The moving image data of the route of movement between the stations and the like is stored in the database 22 in correspondence with a combination of station names of a departure station and an arrival station.

When the user arrives at the transfer station, the navigation unit 19 reads out the moving image data of the route of movement that is stored in the memory unit 15. Then, the navigation unit 19 reproduces the moving image data such that the latitude and longitude information of the moving image data stored for each frame and the latitude and longitude information representing the user's position acquired from the GPS 14 coincide with each other. The moving image data has such resolution that a signboard of a store, a station name, and the like can be visually recognized. In addition, in this embodiment, the moving image data is used for navigation of the route. However, still-image data, data acquired by connecting a plurality of still image data, or the like may be used. The moving image data or the still image data may be live-action data that is actually photographed or a CG.

In addition, the schedule managing unit 20 refers to the schedule table and the reservation table at a predetermined period for the departure time of the transportation (for example, a train, an airplane, a bus, a ship, or the like). Then, when it is prior to an alarm time set in advance, the schedule managing unit 20 notifies the user of the time by using an alarm (speech, vibration, or the like). For example, the schedule managing unit 20 notifies the user of the time by using the alarm at each alarm time of the start date and time written in the schedule table (schedule data), the departure time written in the reservation table (reservation data), and the arrival time written in the reservation table (reservation data). This alarm time may be independently set for the start date and time of each reservation, and each of the departure time and the arrival time of each transportation or may be simultaneously set for each group that is formed by each reservation or each transportation or for all the groups.

In addition, the navigation unit 19 transmits the latitude and longitude information acquired by measuring the user's current location by using the GPS 14 to the information search server 21 with the camera identification information being added thereto, and thereby detecting the position of the user (the digital camera 1) on the map. In other words, the information search server 21 detects whether or not the user is inside a building based on the latitude and longitude information input from the digital camera 1 or whether the movement speed, which is calculated based on the above-described latitude and longitude information and an elapsed time, is equal to or greater than a speed set in advance, for the map data corresponding to the latitude and longitude stored in the database 22 and the map. For example, the information search server 21 determines that a user is moving on transportation in a case where the user moves at a speed equal to or higher than the set speed, based on the detected movement speed.

Then, the information search server 21 transmits the position information (the address in the case where the user is inside a building) on whether the user is inside the building or the user is moving in the vehicle to the digital camera 1.

In the case of notification of an alarm, the schedule managing unit 20 notifies the user that it is the alarm time by using a vibration mechanism of the digital camera 1 as an alarm in a case where the user is inside a building (address) for a meeting or a conference, or the user is in a vehicle.

As a different method of inputting a destination, a user picks up the image of a map of an area that includes the destination with the destination being set as a center portion thereof by using the digital camera 1. Accordingly, the control unit 11 adds the image data of the map, of which the image has been picked up, to search request information, and transmits the image data of the map to the information search server 21 through the communication unit 12. At this time, a correspondence relationship between a reference distance on the map, of which the image has been picked up, and the actual distance is added to the image data as attribute data by posting the correspondence relationship in the map in advance or user's inputting of the correspondence relationship.

When receiving the search request information, the information search server 21 searches for image data of a place that is the same as or similar to the input image data from the world map data. At this time, the information search server 21 matches the scale factors of the image data and the map data in accordance with the correspondence relationship between the reference distance and the actual distance. In addition, for inputting a departure point, the above-described input method using the image data may be used.

In addition, when the different method of inputting a destination is used, the image data of the destination may be image data (past image data) found (or browsed) by the user in the past, image data (past image data) which was picked up on a past business trip, or the like. In addition, the above-described image data may be stored in the memory unit 15 of the digital camera 1 or may be stored in the database 22.

When allowing a user to input a destination, the schedule managing unit 20 reads in the image data from the history table that is stored in the database 22 or the memory unit 15 and displays the image data using a thumbnail image in the image displaying field MP.

When the user touches the thumbnail image, the schedule managing unit 20 extracts a place of the business trip destination from the history table based on the identification information of the selected image data and sets the place as the destination.

In the database 22, history for user's browsing and history for user's business trips are stored in association with each camera identification information. For example, history information as shown in FIG. 14 that has the date (the first date for the case of a business trip during a plurality of dates) of a business trip, a business trip destination (place), image data A used for searching at that time, and image data B that is a photograph of a landscape photographed at the business trip destination is stored in the history table (FIG. 14) of the database 22 in the search order of information needed for schedule management for the business trip destination.

The schedule managing unit 20 reads out the image data used in the past that is stored in the memory unit 15 or the image data picked up at a business trip destination from the memory unit 15. Then, in a case where the image data is used for searching for a destination, the schedule managing unit 20 adds history information indicating that the image data is image data stored in the history table in the past to the image data and transmits a search request signal to the information search server 21.

Then, the schedule managing unit 20 stores the image data and the history information that are used for requesting a search in the memory unit 15.

In addition, when a user returns from a business trip destination or a business trip, the user registers the image data picked up at the business trip destination in the history table of the database 22. At this time, when the user touches the registration icon P to store the image data in the database 22 in association with the business trip destination that is searched before the business trip, the schedule managing unit 20 detects the touch on the registration icon P and displays an input field for the date of the business trip in the displaying field MP. When the user inputs the date of the business trip in the input field, the schedule managing unit 20 displays a list of the image data recorded in association with the date of the business trip in the memory unit 15 in the image displaying field MP as thumbnail images.

Then, as the user selects and touches any one of the thumbnail images displayed in the image displaying field MP, the schedule managing unit 20 reads out image data corresponding to the thumbnail image selected by the user from the memory unit 15, adds the camera identification information, the date of the business trip, and the read-out image data to the registration request information, and transmits the registration request information to the information search server 21. At this time, the schedule managing unit 20 assigns the registration history information to the image data selected from the thumbnail images, which indicates registration in the memory unit 15 and stores the registration history information in the memory unit 15 in association with the image data. Here, one image data or a plurality of image data may be stored in the history table of the database 22.

When receiving the image data to be registered in the history table of the database 22 from the digital camera 1, the information search server 21 registers the image data as the image data B, which is picked up at the business trip destination, in the history table corresponding to the added camera identification information in association with a date that is the same as the date added in the registration request information.

<Side Trip Searching Function>

Next, a side trip searching function according to this embodiment will be described.

The schedule managing unit 20 starts the side trip searching function based on the schedule data and the reservation data that are received from the information search server 21 and stored in the memory unit 15. For example, the schedule managing unit 20 starts the side trip searching function in a case where there is no schedule data or reservation data within a time range of lunch or dinner set in advance. In addition, for example, the schedule managing unit 20 sets the distance between positions calculated based on information (the latitude and longitude information of the scheduled location) of a user's scheduled place at a scheduled time calculated based on the reservation data and the latitude and longitude information representing the user's location measured by the GPS 14 as a detection distance and starts the side trip searching function for navigating another route that is different from the route of which navigation is currently managed in a case where the detection distance is greater than a distance set in advance.

In addition, for example, the schedule managing unit 20 starts the side trip searching function in a case where the latitude and longitude information of the scheduled location and the latitude and longitude information representing the user's current location measured by the GPS 14 do not coincide with each other or in a case where the latitude and longitude information representing the user's current location is not within the range of a distance set in advance from the latitude and longitude information of the scheduled location.

Then, the schedule managing unit 20 transmits information indicating the start of the side trip searching function to the information search server 21 together with the camera identification information thereof.

Accordingly, the information search server 21 transmits an input screen (information of image data used for the user to set an item that becomes the object of the side trip, to be described later, and the product type of the item) for which the object of the side trip that represents what to do during the remaining time is set to the digital camera 1.

Figure 15:
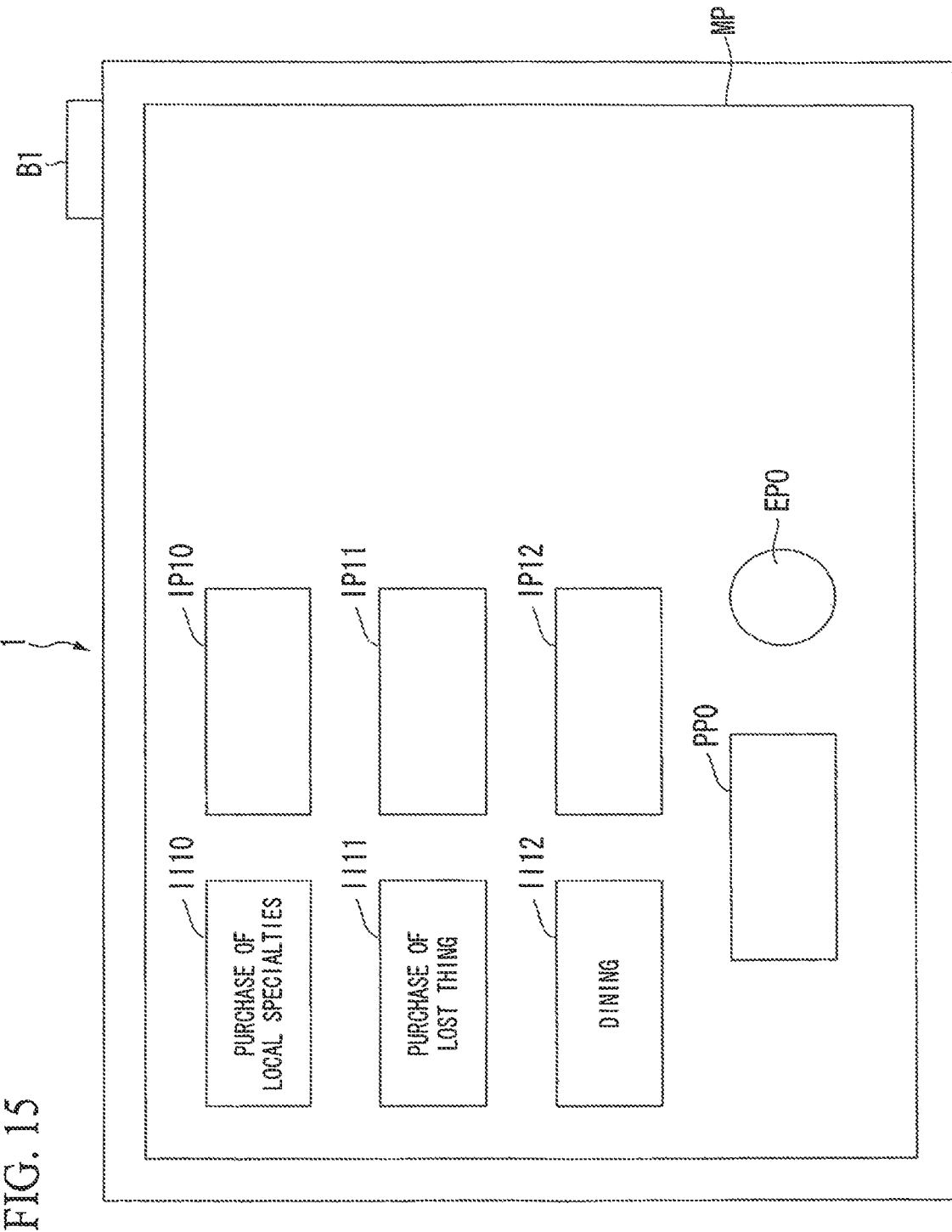
FIG. 15 is a conceptual diagram representing an example of a display image displayed in a digital camera according to this embodiment.

When the input screen for setting the object of the side trip is input from the information search server 21, the control unit 11 displays an input screen, which has been input, for setting the item for the object of the side trip in the image displaying field MP as shown in FIG. 15.

Here, the control unit 11, for example, displays a gift purchase icon IIP10, a lost-thing purchase icon IIP11, and a dining icon II12 in the image displaying field MP as the items of the object of the side trip.

For example, when the user selects the gift purchase icon II10, the control unit 11 displays a combobox for selecting the kind of product as a gift such as a cookie, a toy, and a pickled vegetable as the kinds of the products for the item of the object for purchasing a gift in the display selection field IP10.

In addition, when the user selects the lost thing purchase icon II11, the control unit 11 displays a combobox for selecting the kind of a product to be purchased as a lost thing such as a clothing ornament, miscellaneous goods, stationary, and a pharmaceutical product in the display selection field IP11, as the kinds of products for the item of the object for purchasing a lost product.

In addition, when the user selects the dining icon II12, the control unit 11 displays a combobox for selecting the kind of food, such as Japanese food, Chinese food, Western food, Japanese style pubs, and local specialties, as the kinds of items for the object for dining as the side trip in the display selection field IP12.

When the user selects a kind inside the above-described combobox, the control unit 11 displays the kind of the selected item in the item displaying field PP0 for user's checking the input.

When the user checks the kind of the selected item and selects the confirmation icon EP0, the control unit 11 detects the selection of the confirmation icon EP0 and calculates a different time between the current time and the next scheduled time written in the schedule data. In addition, in a case where there is no next schedule in the schedule data or in a case where the next reservation time in the reservation data is earlier than the next scheduled time, the control unit 11 may calculate a difference between the current time and the next reservation time in the reservation data as the different time.

Then, the control unit 11 transmits the camera identification information thereof to the information search server 21 together with the item identification information of the selected item and the kind identification information of the selected kind. When receiving the item identification information, the different time, and the camera identification information as input, the information search server 21 selects a side trip table, which is shown in FIG. 16, stored in the database 22 in advance. Here, for example, the information search server 21 selects a store in which work can be performed for a time (for example, a time acquired by adding a time required for a round-trip and an average dining time together for dining and a time acquired by adding a time for a round-trip and an average time required for shopping together for shopping) that is shorter than the different time from the side trip table.

The information search server 21 selects an item corresponding to the item identification information from the side trip table and searches for the kind of item in correspondence with the kind identification information.

For example, in a case where the item of the gift is selected, the information search server 21 selects a product corresponding to the item identification information and the kind identification information from the side trip table, reads out a product name, product information (the price of the product and image data of the product), the product identification information, the name of a store that sells the product, the store identification information of the store, the address of the home page, and the address (including the latitude and longitude information) for each selected product, and transmits the read-out information to the digital camera 1 together with the information on image data (this includes the image data of the map; the range of the image data of the map in which all the positions of the transmitted stores can be displayed is selected by the information search server 21) used for selecting the store.

Figure 17:
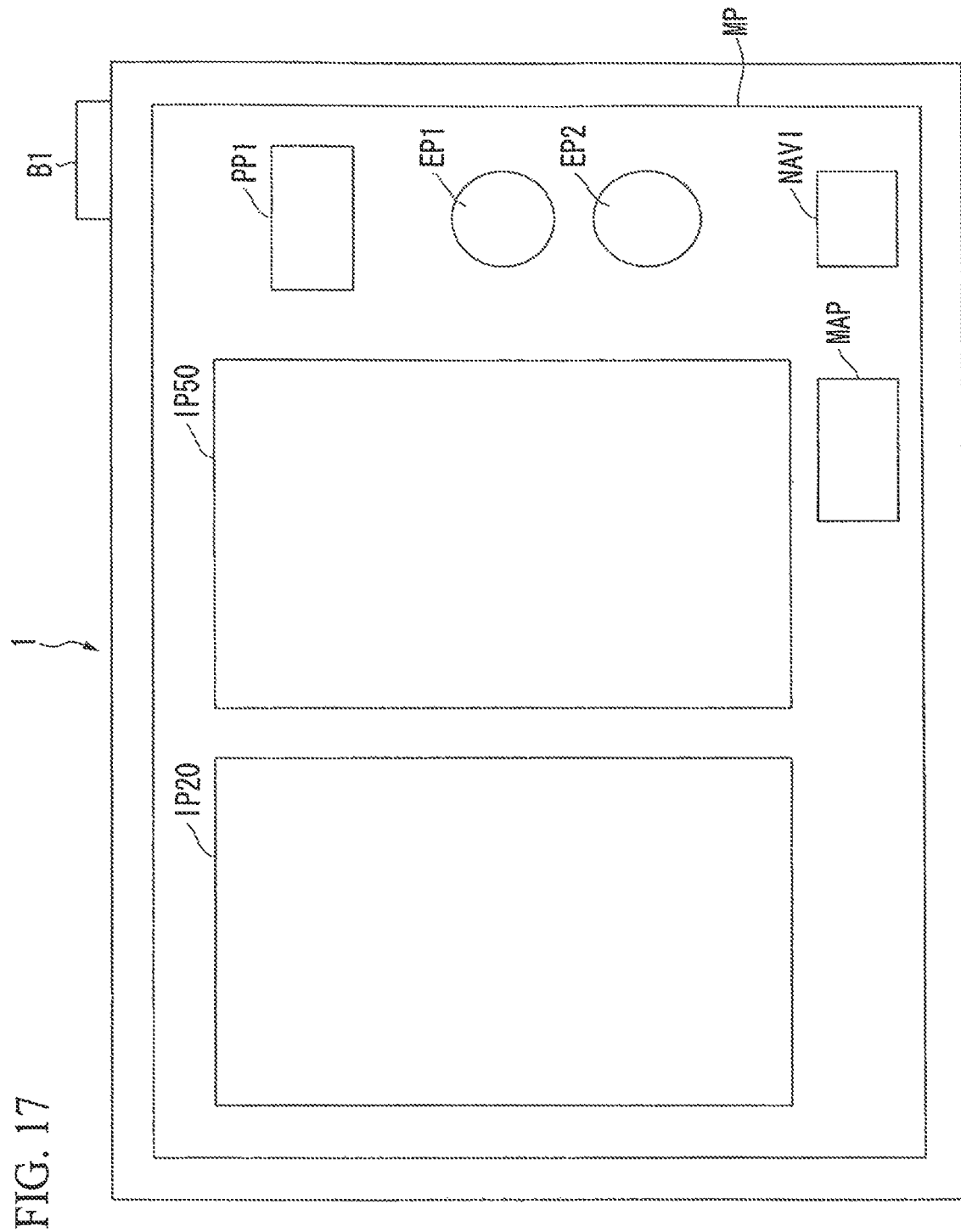
FIG. 17 is a conceptual diagram representing an example of a display image displayed in a digital camera according to this embodiment.

When the information on the image data used for selecting the store is input from the information search server 21, the control unit 11 displays an image, which is represented in FIG. 17, used for selecting a store in the image displaying field MP.

In other words, the control unit 11 displays the product name, an image of the product, the price, and the address of the store for each of one or a plurality of stores that has been input in a store information display selecting field IP20.

In addition, the control unit 11 displays the map data of the map in the store position information displaying field IP50 and displays the transmitted position of the store on the image data of the map based on the latitude and longitude information of the store.

Then, when the user selects a store displayed in the store information display selecting field IP20, the control unit 11 displays a mark indicating the position of the store on the image of the map in a size that is larger than those of other stores or changes the color of the mark in a color different from that of other stores. Accordingly, the user can notice the position of the selected store.

In addition, the control unit 11 displays the store name of the selected store in a store name displaying field PP1.

When the user checks the store displayed in the store name displaying field PP1 and selects the confirmation icon EP1, the control unit 11 transmits the latitude and longitude information of the digital camera 1 and the store identification information of the selected store to the information search server 21 together with selection information that indicates the selection of the store.

When receiving the selection information, the latitude and longitude information as the user's location, and the store identification information as input, the information search server 21 reads out the latitude and longitude information that represents the position of the store based on the store identification information representing the selected store from the side trip table.

In addition, as described above, the navigation unit 19 searches for a route based on the latitude and longitude information of the selected store, the user's latitude and longitude information, and the departure time as the current time, and performs a process of guiding a route from the current location to the store as the destination. In other words, the navigation unit 19 displays a shortest route from the user's current location to the location of the selected store in the map of the store position information displaying field IP50 displayed in the display unit 17 and displays the location of the moving user on the route based on the GPS information, and thereby performing a process of guiding to the store.

In addition, in the database 22, the side trip table shown in FIG. 16 may be arranged for each camera identification information of the user. In the database 22, the user's preference information (for example, information that represents the order of preferences or the like) may be arranged for each product of the side trip table arranged for each camera identification information. As the preference information, for example, the order of the number of times of user's browsing the corresponding product, the number of times a user entering the store selling the corresponding product, the number of times of user's purchasing the corresponding product, the number of times of user's selecting the side trip function, and the like arranged in descending order of the number of times included in the information counted by the information search server 21 or the order of preferences set by the user in advance is used. Here, the preference information has higher priority as the number of times is increased, and thereby the preference becomes higher. In addition, as the preference information, the number of times a user selects an item or the like may be used based on an item corresponding to the product, the store, or the like.

For example, when the user selects the dining icon II12 shown in FIG. 15, the control unit 11 displays a combobox for selecting Japanese food, Chinese food, Western food, a Japanese style pub, or a local specialty as the kind of item of dining in the display selection field IP12.

When the user selects an item of Japanese food, the control unit 11 transmits the item identification information corresponding to the item of the Japanese food and the camera identification information to the information search server 21 of the information search system 2.

When receiving the item identification information from the digital camera 1 as input, the information search server 21 searches a side trip table corresponding to the input camera identification information from the database 22.

The information search server 21 extracts the product identification information of the product name, the store identification information of the store name of the store selling the product, and the address of the store corresponding to the store identification information, which correspond to a number set in advance, in the order of products (in this case, the food menu of the Japanese food) having a higher preference included in the user's preference information as a search result.

When the extraction is completed, the information search server 21 transmits a plurality of extracted product (Japanese food) names, the product identification information, the store name, the store identification information, the address corresponding to the store identification information, and the display order added to each product to the digital camera 1.

Next, the control unit 11 of the digital camera 1 displays the plurality of product names, the product identification information, the store name, the store identification information, and the address corresponding to the store identification information, which have been input from the information search server 21, in the store name display selecting field IP20 based on the display order added to each product.

When the user touches the product displayed in the store name display selecting field IP20 for selection, the control unit 11 displays the store name of the selected product in the store name displaying field PP1.

When the user touches the confirmation icon EP1 for selection, the control unit 11 transmits the latitude and longitude information and the camera identification information of the digital camera 1 to the information search server 21 of the information search system 2 together with the store identification information corresponding to the store displayed in the store name displaying field PP1.

When receiving the store identification information and the latitude and longitude information as the user's location, and the store identification information as input, the information search server 21 searches for the latitude and longitude information representing the location of the store from the side trip table based on the input store identification information.

Then, the information search server 21 transmits the store name of the store corresponding to the input store identification information, the store identification information of the store, and the latitude and longitude information of the store to the navigation unit 19 of the digital camera 1 corresponding to the camera identification information through the communication unit 12.

When receiving the store identification information of the store and the latitude and longitude information of the store as input, as described above, the navigation unit 19 performs a process of guiding a route from the current location to the store as the destination based on the latitude and longitude information of the store selected by the user and the user's latitude and longitude information.

In addition, in this embodiment, when a schedule is changed in accordance with a change in the use time of the transportation, a process of changing the schedule is performed, as described below.

In a case where the user has missed the transportation (a train, an airplane, a bus, or the like) of the departure time that is registered in the reservation table of the database 22, or, to the contrary, in a case where the user has taken the transportation of a time that is earlier than the departure time registered in the reservation table, the user changes his or her schedule by performing the navigation process, which is shown in FIG. 10, described above by touching the route search icon B shown in FIG. 11. In addition, in a case where the user has missed the transportation (a train, an airplane, a bus, or the like) of the departure time that is registered in the reservation table of the database 22, or, to the contrary, in a case where the user has taken the transportation of a time that is earlier than the departure time registered in the reservation table, the user changes his or her schedule by performing the above-described resetting of the schedule management by touching the schedule icon S shown in FIG. 11. In addition, in a case where the user has missed the transportation (a train, an airplane, a bus, or the like) of the departure time that is registered in the reservation table of the database 22, or, to the contrary, in a case where the user has taken the transportation of a time that is earlier than the departure time registered in the reservation table, the above-described operation of user's touching on the route search icon B or the schedule icon S may be omitted. For example, the digital camera 1 according to this embodiment may be configured to detect user's movement (in this case, the digital camera 1) by transportation of a departure time that is different from the departure time registered in the reservation table of the database 22 based on the latitude and longitude information of the GPS 14 by using the control unit 11 or the information search server 21 and to notify the user of the necessity of a schedule change through user buzzer (or vibration) or speech (or music) by using the schedule managing unit 20 or to notify the user of the necessity of a schedule change by allowing the control unit 11 to display the image data of the input screen shown in FIG. 11 through the display unit 17.

Here, the schedule managing unit 20 of this embodiment can newly add or change a time for meeting, dining, or the like by user's touching the schedule icon S. In order to add or change (edit a new schedule) the schedule table, the schedule managing unit 20 outputs schedule management requesting information to the information search server 21. Accordingly, as described above, to add or change the data of the schedule table and the reservation table is performed by the schedule managing unit 20 and the information search server 21.

In addition, in a case where movement from a same place is not detected based on the latitude and longitude information transmitted from the GPS 14 even when a time set in advance elapses from the end date and time registered in the schedule table, or in a case where a distance between the user's current location, which is based on the GPS 14, and a user's scheduled location, which is based on the navigated route, exceeds a distance (for example, 2 km or the like) set in advance, the schedule managing unit 20 outputs an abnormal signal to the control unit 11.

For example, in the case where no movement from a same place is detected even when a predetermined time elapses, there is a high possibility that the user has lost the digital camera 1. In addition, in the case where the distance between the user's current location, which is based on the GPS 14, and the user's scheduled location, which is based on the navigated route, exceeds a distance set in advance, there is high possibility of robbery.

Then, when receiving the above-described abnormal signal, the control unit 11 displays a password input field in the image displaying field MP shown in FIG. 11 and applies a password lock to the digital camera 1 until a password same as the password registered in advance by the user is input to the input field.

As described above, the digital camera 1 according to this embodiment has the above-described security function.

In addition, the operation of the side trip searching function according to this embodiment may be configured to be started by a user's selection. In addition, the operation of the route searching function according to this embodiment may be started not by the schedule managing unit 20 but by the information search server 21.

<Reservation Function>

Next, a reservation process performed by the user for the browsed store (store) or the store selected by the side trip function will be described. Hereinafter, a case of an eating place such as a restaurant will be described as an example.

In the database 22 of the information search system 2, an in-store image memory table in which in-store image data (for example, image data or the like explaining the inside of the store by using a moving picture, a still screen, or a CG) for each store is stored in association with the store identification information stored in the side trip table or the store identification information stored in the building structure table is arranged.

For example, in a state in which the store name, which has been selected in the store name display selecting field IP20 by the user, is displayed in the store name displaying field PP1 shown in FIG. 17, as the user touches the reservation icon EP1, the control unit 11 of the digital camera 1 transmits the store identification information of the above-described selected store, a reservation request signal, and the camera identification information to the information search server 21.

When receiving the reservation request signal from the digital camera 1 as input, the information search server 21 searches for the in-store image data corresponding to the input store identification information from the in-store image memory table of the database 22 and transmits the found in-store image data to the digital camera 1.

Figure 18:
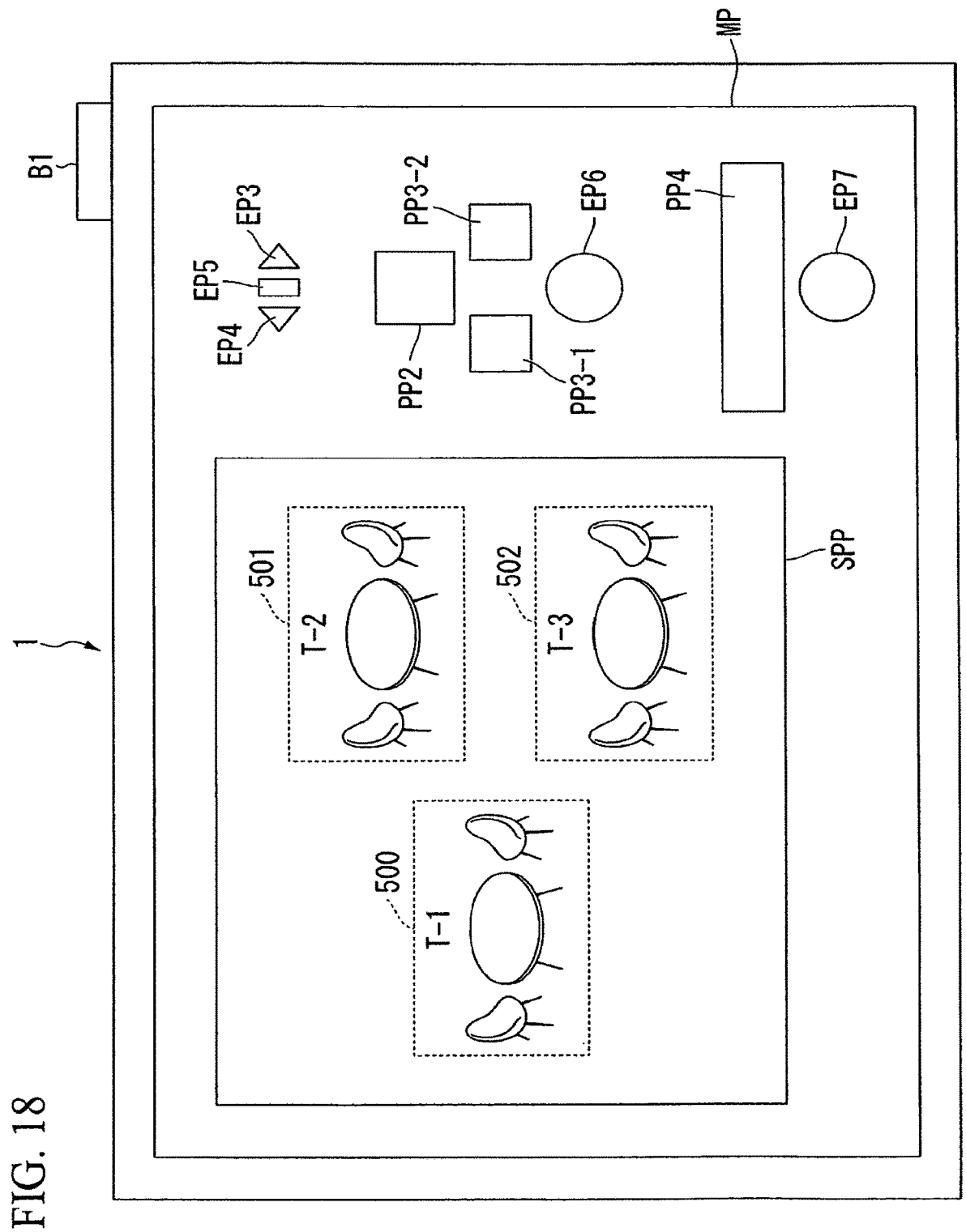
FIG. 18 is a conceptual diagram representing an example of a display image displayed in a digital camera according to this embodiment.

When receiving the in-store image data from the information search server 21, the control unit 11 of the digital camera 1, as shown in FIG. 18, displays the in-store image data in a display frame SPP.

In addition, in the case of the moving picture data (including the CG), as the user touches the reproduction icon EP3 shown in FIG. 18, the control unit 11 detects the touch on the reproduction icon EP3 and starts to reproduce the above-described in-store image data.

In addition, as the user touches a pause icon EP5 at the time of reproduction, the control unit 11 detects the touch on the pause icon EP5 at the time of reproduction and temporarily stops the reproduction of the in-store image data.

At the time of the temporary stop, as the user touches the reproduction icon EP3 or the pause icon EP5, the control unit 11 detects the touch on the reproduction icon EP3 or the pause icon EP at the time of temporary stop and starts to reproduce the in-store image data.

As the user touches a rewinding play icon EP4 at the time of reproduction, the control unit 11 detects the touch on the rewinding play icon EP4 and starts to perform rewinding play for the in-store image data.

Here, as the user touches any of table seats surrounded by frames 500, 501, and 502 in the state in which the reproduction of the in-store image data is temporarily stopped in accordance with the pause icon EP5, the control unit 11 displays a table number written in the range of the table seat selected by the user in a table seat displaying field PP2. For example, when the user touches the table seat of the frame 500 for selection, the control unit 11 detects the selection of the table seat of the frame 500 and displays a table seat number T-1 written within the frame 500 in the table seat displaying field PP2.

In addition, the user inputs the date and time of a reservation in a reservation date and time inputting field PP3-1 and inputs the number of persons for the reservation in a reservation person number inputting field PP3-2. In addition, a calendar may be displayed in the reservation date and time inputting field PP3-1 for user's easy selection of the date and time, so that the user can select the date and time from the calendar.

Then, the user touches a confirmation icon EP6 for making a reservation for the table seat number T-1 that is displayed in the table seat displaying field PP2.

When the confirmation icon EP6 is touched, the control unit 11 detects the touch on the confirmation icon EP6, reads in the store identification information, the table seat number T-1 displayed in the table seat displaying field PP2, the date and time data input to the reservation date and time inputting field PP3-1, and the reservation person number data input to the reservation person number inputting field PP3-2, and outputs the read-out data to the schedule managing unit 20 as reservation data.

When receiving the above-described reservation data, the schedule managing unit 20 transmits a reservation requesting information including the input reservation data and its camera identification number to the information search server 21.

When receiving the above-described reservation requesting information as input, the information search server 21 performs a reservation process by accessing the reservation system of the home page of the store corresponding to the store identification information included in the above-described reservation data and inputting the input table seat number and the reservation date and time in the reservation format of the reservation system.

Then, the information search server 21 transmits the result information indicating whether a reservation could or could not be made for the reservation system of the corresponding store to the control unit 11 of the digital camera 1.

When receiving the result information as input, the control unit 11 displays the input result information in a result displaying field PP4.

In a case where the reservation process is completed or a reservation process is to be performed again, the user touches a return icon EP7.

When the return icon EP7 is touched, the control units 11 detects the touch on the return icon EP7 and displays an image shown in FIG. 17 in the image displaying field MP.

In addition, in this embodiment, the information search server 21 performs the reservation process by accessing the reservation system of the home page of the store corresponding to the store identification information included in the above-described reservation data. However, the reservation process is not limited thereto. For example, the information search server 21 may be configured to perform the reservation process by transmitting items (for example, the table seat number T-1, the date and time data, the number of persons for the reservation, and the like) required for the reservation to the reservation system (for example, a server or the like of the reservation system of the store) of the store corresponding to the store identification information included in the above-described reservation data. In addition, in this embodiment, the reservation process is not limited to be performed by the information search server 21, and for example, the reservation process may be performed by the control unit 11 of the digital camera 1.

In addition, the above-described reservation process is described to be performed by using the moving picture data (including a CG of the same image). However, the same process may be performed for a still screen (including a CG of the still image data) by displaying the still image in the display frame SPP.

In addition, in a case where the store selected by the user in FIG. 17 is a store for purchasing a product such as a gift, the control unit 11 displays a plurality of products of the store in the display frame SPP by using thumbnail images.

For the case of the still image (including a CG of the still image), as the user touches the reproduction icon EP3, the control unit 11 detects the touch on the reproduction icon EP3 and displays thumbnail images of other products selling in the store in the display frame SPP.

As the user touches any one of the thumbnail images of the products displayed in the display frame SPP, the control unit 11 displays the product name of the thumbnail image selected by the user in the table seat displaying field PP2. Next, the user inputs the destination (an address or the like) of the product in the reservation date and time inputting field PP3-1.

Then, in order to purchase the product displayed in the table seat displaying field PP2, the user touches the confirmation icon EP6.

When the confirmation icon EP6 is touched, the control unit 11 detects the touch on the confirmation icon EP6, reads in the store identification information, the product identification information of the product displayed in the table seat displaying field PP2, and the destination input to the reservation date and time inputting field PP3-1, and outputs the read-out information to the schedule managing unit 20 as purchase data.

When receiving the purchase data as input, the schedule managing unit 20 transmits purchase requesting information, which includes the input purchase data and the camera identification information, to the information search server 21.

When receiving the purchase requesting information as input, the information search server 21 performs a purchase process by accessing the purchase system of the home page of the store corresponding to the store identification information and inputting the input product identification information and the destination in a reservation format of the purchase system.

At this time, in a case where the store requests to pay by using a credit card, when receiving the request, the information search server 21 transmits information for urging to input a credit number to the digital camera 1.

When the information directing the user to input the credit number is input, the control unit 11 displays text data, which notifies the user of inputting the credit card number in the reservation date and time inputting field PP3, in the result displaying field PP4.

The user inputs his or her credit card number in the reservation date and time inputting field PP3 in correspondence with the notification and touches the confirmation icon EP6.

When the confirmation icon EP6 is touched, the control unit 11 detects the touch on the confirmation icon, reads in the credit card number displayed in the reservation date and time inputting field PP3, and transmits the credit card number and the camera identification number to the information search server 21.

When receiving the credit card number and the camera identification information as input, the information search server 21 writes the input credit card number into the credit card number inputting field of the purchase system of the store for payment in accordance with the camera identification information and completes the payment for the product purchased by the user.

Then, when completion information including information indicating that the purchase process has been completed without any problem and a delivery date and time of the product is input from the purchase system of the store, the information search server 21 transmits the completion information to the digital camera 1.

When the completion information is input, the control unit 11 displays the information indicating completion without any problem and the delivery date and time of the product in the result displaying field PP4.

In addition, in this embodiment, the information search server 21 performs the purchase process by accessing the purchase system of the home page of the store corresponding to the store identification information. However, the purchase process is not limited thereto. For example, the information search server 21 may be configured to perform the purchase process by transmitting items (for example, the product, the destination, the credit card number, and the like) required for the purchase to the purchase system (for example, a server or the like of the purchase system of the store) of the store corresponding to the above-described store identification information. In addition, in this embodiment, the purchase process is not limited to be performed by the information search server 21, and for example, the purchase process may be performed by the control unit 11 of the digital camera 1.

In addition, in a case where navigation for the route to the restaurant is desired, the user touches the navigation icon NAV1 in a state in which the restaurant name is displayed in the store name displaying field PP1.

When the navigation icon NAVI is touched, the control unit 11 detects the touch on the navigation icon, reads in the store identification information written into the store name displaying field PP1, and outputs the store identification information to the navigation unit 19 together with a navigation request signal.

When receiving the navigation request signal as input, the navigation unit 19 transmits route search information, which includes the input store identification information, the position information in which the digital camera 1 is located, and the camera identification information, to the information search server 21.

When receiving the route search information as input, the information search server 21 searches for the position information of the store corresponding to the store identification information from the side trip table.

Then, the information search server 21 reads in map data of a region in which a station located closest to the store, a route from the a station located near the user's current location to the above-described closest station, and a route from the above-described closest station to the store are displayed from the database 22 based on the position information of the store, and transmits the read-out information to the digital camera 1 as route information.

The navigation unit 19 of the digital camera 1 displays a screen as shown in FIG. 18 and displays the route from the user's current location to the nearby station in the display frame SPP.

Then, when detecting that the user arrives at the nearby station by comparing the position information of the GPS and the position information of the nearby station together, the navigation unit 19 updates the display screen of the display frame SPP on the display screen in which the route from the nearby station to the above-described closest station.

The navigation unit 19 detects that the user arrives at the above-described closest station by comparing the position information of the GPS and the position information of the above-described closest station together and updates the display screen of the display frame SPP on the display screen in which the route from the above-described closest station to the store. Then, the navigation unit 19 allows the user to visually recognize a user's location on the route by displaying the user's current location on the route from the above-described closest station to the store based on the position information by using the GPS 14.

In addition, in FIG. 17, when the user touches a MAP icon, the navigation unit 19 acquires the position information by using the GPS 14 and transmits map requesting information that is acquired by adding the camera identification information and a map request signal to the above-described position information to the information search server 21.

When receiving the map requesting information as input, the information search server 21 reads in the map data of a region in a range set in advance from the database 22, searches for the store information (for example, the position information, the type of the store, the store identification information, and the like) in the range of the map data based on the position information included in the map requesting information from the side trip table, and transmits the map data and the store information to the digital camera 1.

When the store information and the map data are input, the control unit 11 displays the map data in the store name display selecting field IP20 and simultaneously displays store names of the stores in positions in which the stores are located based on the positions of each store on the map data.

When detecting a signal indicating user's touch on the store name on the map in the store name display selecting field IP20, the control unit 11 displays the touched store name in the store name displaying field PP1.

In the process performed thereafter, the reservation process, the purchase process, and the navigation process can be performed the same as those in the above-described embodiment.

As described above, according to this embodiment, the user can perform a search for a route from the departure point to the destination, a reservation for transportation in the route, a reservation for a hotel, and navigation from the departure point to the destination. Accordingly, the user can plan and have a business trip or a traveling schedule in an easy manner.

In addition, in this embodiment, in a business trip or travel, after arriving at the destination, the user can perform an action corresponding to the schedule based on a time table scheduled before departure. Accordingly, navigation for a destination or the like, a reservation for a restaurant, and purchase of a product can be performed in an easy manner.

In addition, the information search or the detection process of navigation may be performed by respectively recording a program for implementing the function of the digital camera 1 (excluding a hardware process of the communication unit 12 in transmission and reception of electric waves) shown in FIGS. 1 and 9 and a program for implementing the function of the information search server 21 on a computer-readable recording medium and allowing the programs recorded on the recoding medium to be read in and executed by a computer system. In addition, the "computer system" described here includes an OS and hardware such as a peripheral device. In addition, the "computer system" includes a WWW system having environments for providing a home page (or environments for display) as well. In addition, the "computer-readable recording medium" represents a memory device including a portable medium such as a flexible disk, a magneto-optical disk, a ROM, or a CD-ROM and a hard disk that is built in the computer system. Furthermore, the "computer-readable recording medium" includes a device such as a volatile memory (RAM) disposed inside a computer system, which becomes a server or a client in a case where a program is transmitted through a network such as the Internet or a communication line such as a telephone line, storing a program for a predetermined time.

In addition, the above-described program may be transmitted from a computer system that stores the program in a memory device or the like to another computer system through a transmission medium or a transmitted wave in the transmission medium. Here, the "transmission medium" that transmits a program represents a medium such as a network (telecommunication network) including the Internet or a communication line (telecommunication line) including a telephone line that has a function of transmitting information. In addition, the above-described program may be used for implementing a part of the above-described function.

Furthermore, the program may be an element that is combined with a program that is already recorded in the computer system for implementing the above-described function, that is, so-called difference file (difference program).

An embodiment relates to a mobile information device and an image pickup device that have a function of acquiring information on the location in which the image of a subject is picked up at a time when the image of the subject is picked up and associating the subject and the information on the location with each other and an information acquisition system that acquires the information on the subject by using the information.

According to an embodiment, azimuth information (for example, an azimuth angle) for acquiring a direction in which a subject photographed by a user is located from a photographing position can be acquired.

According to an embodiment, information on a subject, for example, a building structure that is photographed by a user can be acquired in an easy manner.

According to an embodiment, a reservation process for transportation on a route can be performed based on information on the route that has been found based on the input route information.

What is claimed is:

1. An information acquisition system comprising:
a mobile terminal; and
an information search system,
wherein the information search system searches for information on a subject of which an image is picked up by the mobile terminal and transmits search result information to the mobile terminal,
wherein the mobile terminal includes:
   a body that is configured to be portably held by a user;
   an image sensor that is provided in the body and is configured to pick up the image of the subject via lens provided in the body;
   a locator that is provided in the body and is configured to output position information of the mobile terminal;
   a transmitter; and
   a memory,
wherein the information search system includes:
   a database in which the information on the subject is stored in correspondence with the position information and the image of the subject; and
   an information search server that searches for the information on the subject from the database based on the position information and the image of the subject, and
wherein the mobile terminal further includes:
   a touch panel display that is provided in the body and that is configured to display the image of the subject and the information on the subject; and
   a controller that is provided in the body and is configured to:
      display, on the touch panel display, a live view obtained via the lens and the image sensor provided in the mobile terminal held by the user;
      in response to a touch operation in which the user selects a local area including a selected building structure in the live view on the touch panel display of the mobile terminal held by the user while displaying the live view obtained via the lens and the image sensor provided in the mobile terminal held by the user, display the search result information on the touch panel display while displaying the live view obtained via the lens and the image sensor, the search result information including a plurality of relevant structure images and respective relevant text information, the search result information being based on the position information and a result of an image recognition for at least a building structure in the image of the subject; and
      in response to another touch operation of the touch panel display while the search result information is displayed on the touch panel display, display additional information about the subject on the touch panel display, wherein the search result information is output, based on the image recognition, by comparing a characteristic amount of the selected building structure with a characteristic amount of each relevant structure image extracted from the database of the information search system by using the position information.

2. The information acquisition system according to claim 1,
wherein the mobile terminal includes a distance measuring sensor that outputs distance information between the subject and the body, and
wherein the mobile terminal transmits the distance information to the information search system.

3. The information acquisition system according to claim 1, wherein the mobile terminal includes an orientation sensor that outputs orientation information of the mobile terminal.

4. A portable information device configured to be in wireless communication with an information search server via an information communication network, the portable information device comprising:
a body that is configured to be portably held by a user;
an image sensor that is provided in the body and is configured to pick up an image of a subject via lens provided in the body;
a locator that is provided in the body and is configured to output position information of the portable information device;
a transmitter that is provided in the body and is configured to transmit the image and the position information to the information search server and receive search result information from the information search server;
a memory that is provided in the body;
a touch panel display that is provided in the body; and
a controller that is provided in the body and is configured to:
   display, on the touch panel display, a live view obtained via the lens and the image sensor provided in the portable information device held by the user;
   in response to a touch operation in which the user selects a local area including a selected building structure in the live view on the touch panel display of the portable information device held by the user while displaying the live view obtained via the lens and the image sensor provided in the portable information device held by the user, display the search result information on the touch panel display while displaying the live view obtained via the lens and the image sensor, the search result information including a plurality of relevant structure images and respective relevant text information, the search result information being based on the position information and a result of an image recognition for at least a building structure in the image of the subject; and in response to another touch operation of the touch panel display while the search result information is displayed on the touch panel display, display additional information about the search result information on the touch panel display, wherein the search result information is output, based on the image recognition, by comparing a characteristic amount of the selected building structure with a characteristic amount of each relevant structure image extracted from a database of the information search server by using the position information.

5. An information acquisition system comprising:
a server; and
the portable information device of claim 4.

6. The portable information device according to claim 4, wherein the controller is configured to:
display, on the touch panel display, a plurality of subject images that are stored in the memory,
in response to the touch operation in which the user selects the local area including the building structure in the live view on the touch panel display corresponding to one subject image among the stored subject images, display the search result information along with the one subject image on the touch panel display.

7. The portable information device according to claim 4, further comprising:
an azimuth sensor that is provided in the body, wherein the position information is used along with azimuth information of the portable information device provided from the azimuth sensor.

8. The portable information device according to claim 4, wherein the additional information includes related text information and related image information on one of the relevant structure images displayed on the touch panel display.

9. The portable information device according to claim 4, wherein
at least one of the relevant structure images is of a store, and
the additional information includes commercial information, the commercial information including an image captured inside of the store and product information.

10. The portable information device according to claim 4, wherein
at least one of the relevant structure images is of a store, and
the additional information includes posted information of the store.

* * * * *